United States Patent
Park et al.

(10) Patent No.: US 11,137,529 B2
(45) Date of Patent: Oct. 5, 2021

(54) CAMERA MODULE AND METHOD FOR ASSEMBLING SAME

(71) Applicant: LG INNOTEK CO., LTD., Seoul (KR)

(72) Inventors: Ji Hwan Park, Seoul (KR); Myoung Jin An, Seoul (KR); Dong Wook Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/321,280

(22) PCT Filed: Jul. 7, 2017

(86) PCT No.: PCT/KR2017/007283
§ 371 (c)(1),
(2) Date: Jan. 28, 2019

(87) PCT Pub. No.: WO2018/021722
PCT Pub. Date: Feb. 1, 2018

(65) Prior Publication Data
US 2019/0170920 A1 Jun. 6, 2019

(30) Foreign Application Priority Data

Jul. 29, 2016 (KR) .......................... 10-2016-0096738
Aug. 11, 2016 (KR) .......................... 10-2016-0102384

(51) Int. Cl.
*G02B 5/28* (2006.01)
*G02B 21/36* (2006.01)
(Continued)

(52) U.S. Cl.
CPC ............... *G02B 5/283* (2013.01); *G02B 5/28* (2013.01); *G02B 7/00* (2013.01); *G02B 7/02* (2013.01);
(Continued)

(58) Field of Classification Search
CPC .... H04N 5/225; H04N 5/2252; H04N 5/2253; H04N 17/002; G02B 7/02; G02B 5/28;
(Continued)

(56) References Cited

U.S. PATENT DOCUMENTS 8,786,771 B2    7/2014  Wang et al.
2014/0184902 A1* 7/2014  Chen .................... H04N 5/2257
                                                         348/374
(Continued)

FOREIGN PATENT DOCUMENTS

CN    102449524 A    5/2012
CN    106162159 A    5/2012
(Continued)

*Primary Examiner* — Lin Ye
*Assistant Examiner* — Chan T Nguyen
(74) *Attorney, Agent, or Firm* — Birch, Stewart, Kolasch & Birch, LLP

(57) ABSTRACT

One embodiment of a camera module comprises: a lens part; a front body on which the lens part is mounted; a substrate part which is disposed apart from the lens part in a first direction and coupled to the front body; an image sensor which is disposed on the substrate part and disposed opposite to the lens part; and a first adhesive part which is disposed between the front body and the substrate part, wherein the front body and the substrate part are coupled by the first adhesive part, and at least one through-hole is formed between the front body and the substrate part.

19 Claims, 29 Drawing Sheets

(51) Int. Cl.
*G03B 3/04* (2021.01)
*H04N 5/225* (2006.01)
*G02B 7/02* (2021.01)
*G02B 7/00* (2021.01)
*G02B 7/04* (2021.01)

(52) U.S. Cl.
CPC ............... *G02B 7/04* (2013.01); *G02B 21/36* (2013.01); *G03B 3/04* (2013.01); *H04N 5/225* (2013.01); *H04N 5/2252* (2013.01)

(58) Field of Classification Search
CPC . G02B 7/00; G02B 7/04; G02B 21/36; G02B 7/021; G02B 7/022; G02B 7/025; G03B 3/04
USPC ........................................................ 348/340
See application file for complete search history.

(56) References Cited

U.S. PATENT DOCUMENTS

| | | | |
|---|---|---|---|
| 2015/0205186 A1* | 7/2015 | Park | ................ G03B 17/08 348/373 |
| 2016/0024676 A1* | 1/2016 | Willigan | ............... B32B 15/017 428/609 |
| 2018/0020131 A1* | 1/2018 | Zhao | ..................... H01R 13/04 |
| 2018/0120586 A1* | 5/2018 | Kim | ..................... G02B 27/646 |
| 2018/0246290 A1* | 8/2018 | Wang | ................ G02B 7/025 |
| 2019/0148429 A1* | 5/2019 | Wang | ................ H01L 27/14618 348/294 |

FOREIGN PATENT DOCUMENTS

| | | |
|---|---|---|
| CN | 103364915 A | 10/2013 |
| CN | 103428412 A | 12/2013 |
| CN | 105763869 A | 7/2016 |
| EP | 3045969 A1 | 3/2009 |
| JP | 2000-244785 A | 9/2000 |
| JP | 2004-233482 A | 8/2004 |
| JP | 2011-35830 A | 2/2011 |
| JP | 2011-205221 A | 10/2011 |
| JP | 2011-259101 A | 12/2011 |
| JP | 2016-111676 A | 6/2016 |
| KR | 10-2009-0026525 A | 3/2009 |
| KR | 10-2010-0099874 A | 9/2010 |
| KR | 1020100099874 * | 9/2010 |
| KR | 10-2011-0131589 A | 12/2011 |
| KR | 10-2012-0007273 A | 1/2012 |
| KR | 10-1220651 B1 | 1/2013 |
| KR | 10-2016-0027852 A | 3/2016 |
| WO | 2010/111465 A1 | 9/2010 |

\* cited by examiner

CAMERA MODULE AND METHOD FOR ASSEMBLING SAME

CROSS REFERENCE TO RELATED APPLICATIONS

This application is the National Phase of PCT International Application No. PCT/KR2017/007283, filed on Jul. 7, 2017, which claims priority under 35 U.S.C. 119(a) to Patent Application No. 10-2016-0096738, filed in the Republic of Korea on Jul. 29, 2016, and Patent Application No. 10-2016-0102384, filed in the Republic of Korea on Aug. 11, 2016, all of which are hereby expressly incorporated by reference into the present application.

TECHNICAL FIELD

Embodiments relate to a camera module and a method of assembling the same.

BACKGROUND ART

The content described in this section merely provides background information regarding embodiments, and does not constitute the related art.

A camera module may be installed in a vehicle for various purposes. For example, a vehicle may be provided at the rear side thereof with a camera module for securing a view to the rear of the vehicle when the vehicle is parked.

In addition, a camera module may also be used in a black box for a vehicle, which is very useful in retracing the details of a traffic accident, including the cause of the accident. Furthermore, a camera module has been increasingly used as a recognition device for easily and clearly recognizing the situation in a blind spot, which a driver or a passenger in a vehicle cannot easily check with the naked eye.

In recent years, smart cars, i.e. vehicles equipped with respective collision warning systems for warning of the possibility of a collision in front of the vehicle or to the rear of the vehicle while the vehicle is traveling or a collision avoidance system for directly avoiding a collision between the vehicle and other vehicles running beside the vehicle under the control of a controller installed in the vehicle, rather than based on the driving of a driver, have been increasingly produced, and related technologies have been increasingly developed.

A camera module has been increasingly used as a means for recognizing the situation outside a smart car. As a result, camera modules for vehicles have been increasingly developed and produced.

A camera module may include an image sensor, which is located at a position facing a lens in an optical-axis direction. When the camera module is assembled, the focal point of the lens is located within a design range of the image sensor.

However, in some cases, the focal point of the lens may be located out of a design range when the camera module is assembled. Therefore, countermeasures therefor are required.

Further, some parts may be deformed or damaged when the camera module is assembled. Therefore, countermeasures therefor are required.

DISCLOSURE

Technical Problem

Therefore, embodiments relate to a camera module having a structure capable of preventing the focal point of a lens from being located out of a design range and preventing parts from being deformed or damaged when the camera module is assembled, and a method of assembling the same.

In addition, embodiments relate to a camera module having a simple and easy-to-assemble structure.

However, the objects to be accomplished by the embodiments are not limited to the above-mentioned objects, and other objects not mentioned will be clearly understood by those skilled in the art to which the embodiments pertain from the following description.

Technical Solution

A camera module according to one embodiment may include a lens unit; a front body to which the lens unit is installed; a board unit spaced apart from the lens unit in a first direction, the board unit being coupled to the front body; an image sensor disposed on the board unit, the image sensor facing the lens unit; and a first adhesion unit disposed between the front body and the board unit, wherein the first adhesion unit may couple the front body and the board unit to each other, and at least one through-hole may be formed between the front body and the board unit.

A method of assembling a camera module according to one embodiment may include a preparation step of providing a front body to which a lens unit is installed or a board unit to which an image sensor is installed; an adhesive application step of applying an adhesive to a first surface of the front body or to a second surface of the board unit; an alignment step of locating the adhesive between the first surface of the front body and the second surface of the board unit; a focal point adjustment step of locating the focal point of the lens unit within an active region of the image sensor through parallel movement, tilting or rotation of the board unit; and an adhesive-curing step of curing the adhesive, wherein, in the adhesive application step, the adhesive may be applied in such a manner that the starting end of the adhesive and the terminating end of the adhesive are spaced apart from each other.

A camera module according to another embodiment may include a lens holder having therein a hollow region; a first lens unit accommodated in the hollow region, the first lens unit including a plurality of lenses arranged in an optical-axis direction; a second lens unit coupled to the lens holder to close the hollow region, the second lens unit being aligned with the first lens unit in the optical-axis direction; a printed circuit board disposed to face the first lens unit and the second lens unit in the optical-axis direction; a spacer disposed between the first lens and the second lens; an image sensor disposed on the printed circuit board, the image sensor facing the first lens unit and the second lens unit in the optical-axis direction; and a filter disposed between the first lens unit and the image sensor, the filter facing the first lens unit and the image sensor in the optical-axis direction.

Advantageous Effects

In the embodiment, when air occupying a space formed by the front body and the board unit expands while the first adhesion unit is heated to be cured, a portion of the air moves outside through the through-hole, thereby preventing the focal length of the camera module from exceeding a design range and preventing the first adhesion unit or the board unit from being deformed or damaged due to expansion of the air.

In the embodiment, since the front body and the board unit of the camera module are coupled to each other through an active alignment process, the focal point of a lens unit, which is coupled to the front body, may be located at an optimum position in an image sensor, which is installed on the board unit, and consequently, the quality of an image captured by the camera module may be improved.

In the embodiment, since lenses are directly installed in a lens holder without using a separate lens barrel, it is possible to prevent the occurrence of a large difference between a design position of the lens barrel and the actual position thereof in the camera module, compared to the configuration using a lens barrel.

In particular, since the tilting angle of a first lens unit does not exceed a design range, the alignment of the focal length between the first lens unit and the image sensor becomes easy and simple.

In the embodiment, an adhesive application process may be omitted by installing the first lens unit to the front body without using an adhesion method, and thus the camera module assembly process may be performed rapidly and simply.

In addition, because a lens barrel is not used, it is not necessary to use a separate sealing member included in a lens barrel.

In the embodiment, when air occupying the internal space expands while the adhesion unit is heated to be cured, a portion of the air moves outside from the internal space through the opening, thereby preventing the focal length of the camera module from exceeding a design range and preventing the adhesion unit or the printed circuit board from being damaged due to expansion of the air.

As a result, the camera module according to the embodiment is capable of preventing the focal length of the camera module from exceeding a design range and preventing the adhesion unit or the printed circuit board from being damaged, thereby preventing defective operation.

BEST MODE

Figure 1:
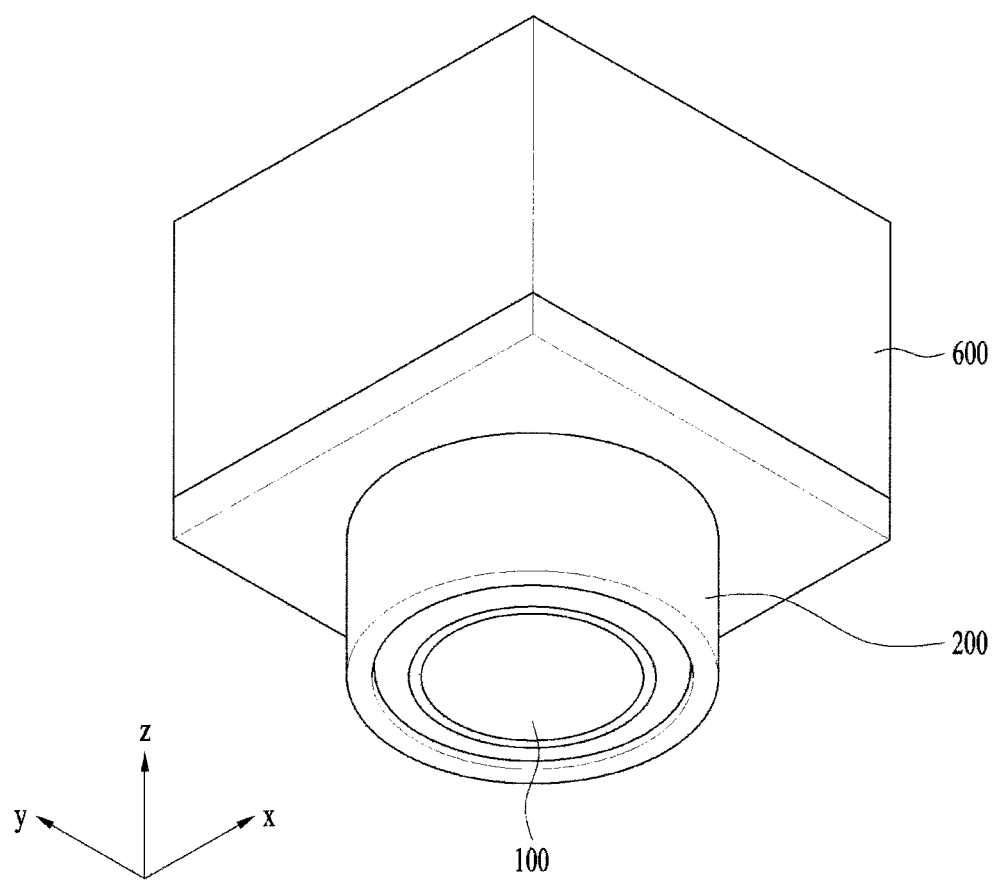
FIG. 1 is a perspective view illustrating a camera module according to one embodiment.

Hereinafter, embodiments will be described in detail with reference to the accompanying drawings. While the disclosure is subject to various modifications and alternative forms, specific embodiments thereof are shown by way of example in the drawings and are explained in detail in the description. However, the disclosure should not be construed as being limited to the embodiments set forth herein, but on the contrary, the disclosure is intended to cover all modifications, equivalents, and alternatives falling within the spirit and scope of the embodiments.

It may be understood that, although the terms "first," "second," etc. may be used herein to describe various elements, these elements are not to be construed as being limited by these terms. These terms are generally only used to distinguish one element from another. In addition, terms particularly defined in consideration of the construction and operation of the embodiments are used only to describe the embodiments, but do not define the scope of the embodiments.

It will be understood that when an element is referred to as being "on" or "under" another element, it can be directly on/under the element, or one or more intervening elements may also be present. When an element is referred to as being "on" or "under," "under the element" as well as "on the element" can be included based on the element.

In addition, relational terms, such as "on/upper part/above" and "under/lower part/below," are used only to distinguish between one subject or element and another subject or element, without necessarily requiring or involving any physical or logical relationship or sequence between the subjects or elements.

In addition, a Cartesian coordinate system (x, y, z) may be used in the drawings. In the drawings, the x-axis and the y-axis are axes perpendicular to an optical axis. For convenience, the optical-axis direction (z-axis direction) may be referred to as a "first direction", the x-axis direction may be referred to as a "second direction", and the y-axis direction may be referred to as a "third direction".

Figure 2:
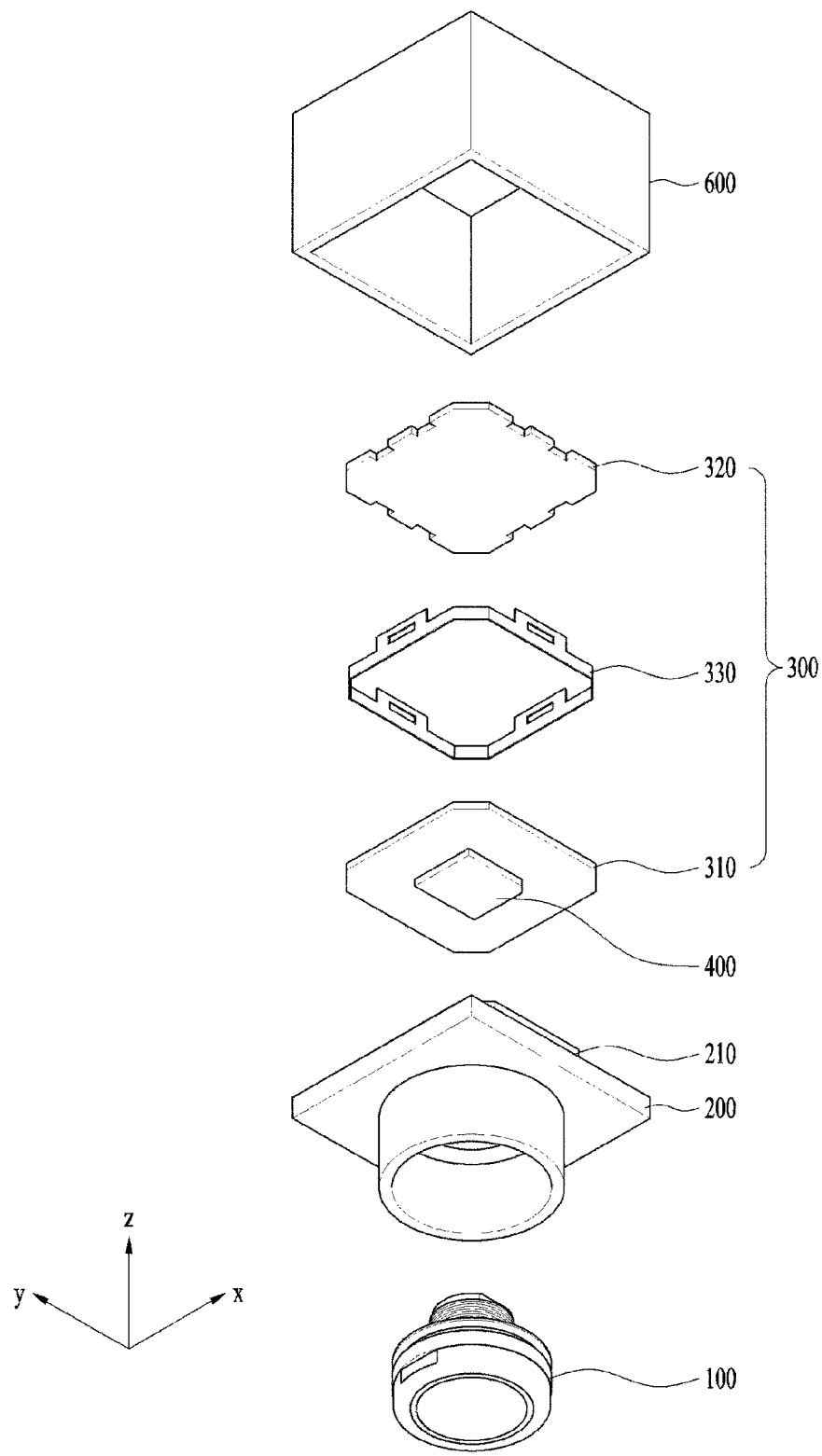
FIG. 2 is an exploded perspective view illustrating the camera module according to one embodiment.
Figure 3:
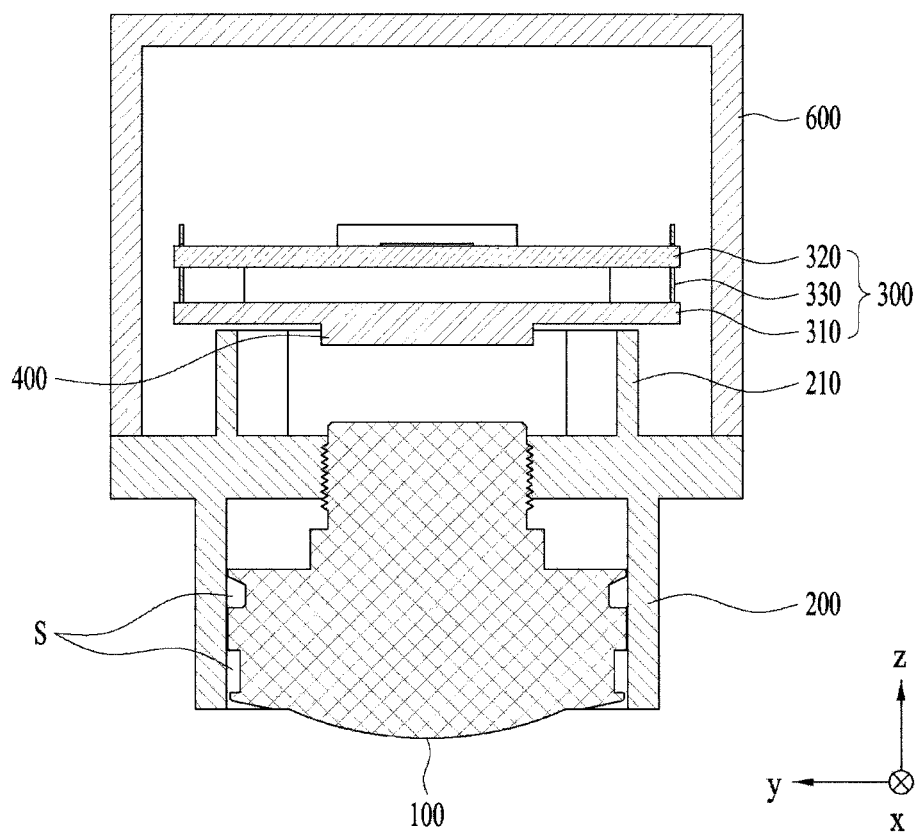
FIG. 3 is a cross-sectional view illustrating the camera module according to one embodiment.

FIG. 1 is a perspective view illustrating a camera module according to one embodiment. FIG. 2 is an exploded perspective view illustrating the camera module according to one embodiment. FIG. 3 is a cross-sectional view illustrating the camera module according to one embodiment. Illustration of a first adhesion unit 500 is omitted from FIGS. 2 and 3 for clarity.

The camera module according to the embodiment may include a lens unit 100, a front body 200, a board unit 300, an image sensor 400, a first adhesion unit 500, and a rear body 600.

The lens unit 100 may be disposed at the front side of the camera module. Light introduced from outside the camera module may pass through the lens unit 100 and may be incident on the image sensor 400, which is disposed so as to face the lens unit 100 in the first direction.

The lens unit 100 may include at least one lens. Alternatively, two or more lenses may be arranged in a line in the optical-axis direction to form an optical system.

Alternatively, the lens unit 100 may include a lens barrel, in which a through-hole is formed in the optical-axis direction, and in which an optical system, formed by arranging one or two or more lenses in a line in the optical-axis direction, is disposed in the through-hole.

The lens unit 100 may be installed to the front body 200. Alternatively, the lens unit 100 may be integrally formed with the front body 200.

The front body 200, to which the lens unit 100 is installed, may be coupled to the rear body 600 to form a space in which the board unit 300 is accommodated. The front body 200, as illustrated in FIGS. 1 and 2, may be provided with flanges protruding from the side surfaces thereof so as to be coupled to the rear body 600.

The flanges of the front body 200 may be coupled to the end portion of the rear body 600. The flanges of the front body 200 and the end portion of the rear body 600 may be coupled to each other using, for example, an adhesive. Alternatively, the front body 200 and the rear body 600 may be formed from a metal material and may be coupled to each other through welding or the like.

In order to prevent foreign substances from being introduced into the camera module, the coupling region between the front body 200 and the rear body 600 needs to be sealed. Thus, when the front body 200 and the rear body 600 are coupled to each other through adhesion, welding or the like, it is desirable to seal the coupling region therebetween.

In another embodiment, the front body 200 and the rear body 600 may be coupled to each other using fastening members such as bolts. A gasket may be provided at the coupling region between the front body 200 and the rear body 600 in order to prevent foreign substances from being introduced into the camera module.

The board unit 300 may be disposed so as to be spaced apart from the lens unit 100 in the first direction, and may be coupled to the front body 200. The board unit 300 may include a first board 310, a second board 320, and a board-fixing member 330.

The image sensor 400 may be installed on one surface of the first board 310. The one surface of the first board 310, on which the image sensor 400 is installed, may be disposed so as to face the lens unit 100. The first board 310 may be electrically connected to the second board 320, and may be provided with various elements and circuit wirings to transmit or receive electric signals to or from the second board 320.

The second board 320 may be disposed so as to be spaced apart from the first board 310 in the first direction. The second board 320 may be electrically connected to the first board 310, and may be provided with various elements and circuit wirings to transmit or receive electric signals to or from the first board 310.

Particularly, the second board 320 may be provided with a power supply device for supplying power to the first board 310, and the power supply device may be electrically connected to an external power source. Although the second board 320 is illustrated in FIGS. 2 and 3 as being provided in a singular number, the second board 320 may be provided in a plural number so as to be spaced apart from each other in the first direction.

At least a portion of the board-fixing member 330 may be coupled with the first board 310 and the second board 320. The board-fixing member 330 may enable the first board 310 and the second board 320 to maintain a constant spacing therebetween in the first direction.

Since the first board 310 and the second board 320 may be provided with various elements and circuit wirings, it is desirable to space the first board 310 and the second board 320 apart from each other using the board-fixing member 330 in order to prevent damage to the elements or a short circuit between the circuit wirings attributable to contact therebetween.

In addition, the board-fixing member 330 may enable the first board 310 and the second board 320 to maintain the coupling state therebetween. The concrete configuration of the board unit 300 including the board-fixing member 330 will be described later with reference to FIG. 8.

The lens unit 100 and the front body 200 may be integrally formed with each other. However, in one embodiment, as illustrated in FIG. 3, the lens unit 100 may be installed to the front body 200. The method by which the lens unit 100 is coupled to the front body 200 may be, for example, a thread-engagement method. That is, female threads may be formed in the hollow region in the front body 200 and male threads may be formed in the outer circumferential surface of the lens unit 100 so that the lens unit 100 and the front body 200 are coupled to each other.

Meanwhile, water or other foreign substances may be introduced into the camera module through a gap present in the coupling region between the lens unit 100 and the front body 200. In order to prevent this, a sealing member such as an O-ring may be provided. For example, as illustrated in FIG. 3, the sealing member may be disposed in a space S formed between the hollow region in the front body 200 and the outer circumferential surface of the lens unit 100.

The image sensor 400 may be disposed on the board unit 300 so as to face the lens unit 100. Light that has passed through the lens unit 100 may be incident on the image sensor 400, and the image of a subject may be captured by the image sensor 400.

The image captured by the image sensor 400 may be converted into an electric signal, and the electric signal may be transmitted to an external display device, an external storage device, or the like.

The rear body 600 may be coupled to the front body 200, and may accommodate the board unit 300 and the image sensor 400 therein. The rear body 600 may have a box configuration having an open side, and may be coupled at the open side thereof to the flanges provided at the front body 200.

As described above, the rear body 600 and the front body 200 may be coupled to each other to form a space for accommodating the board unit 300 and the image sensor 400.

Figure 4:
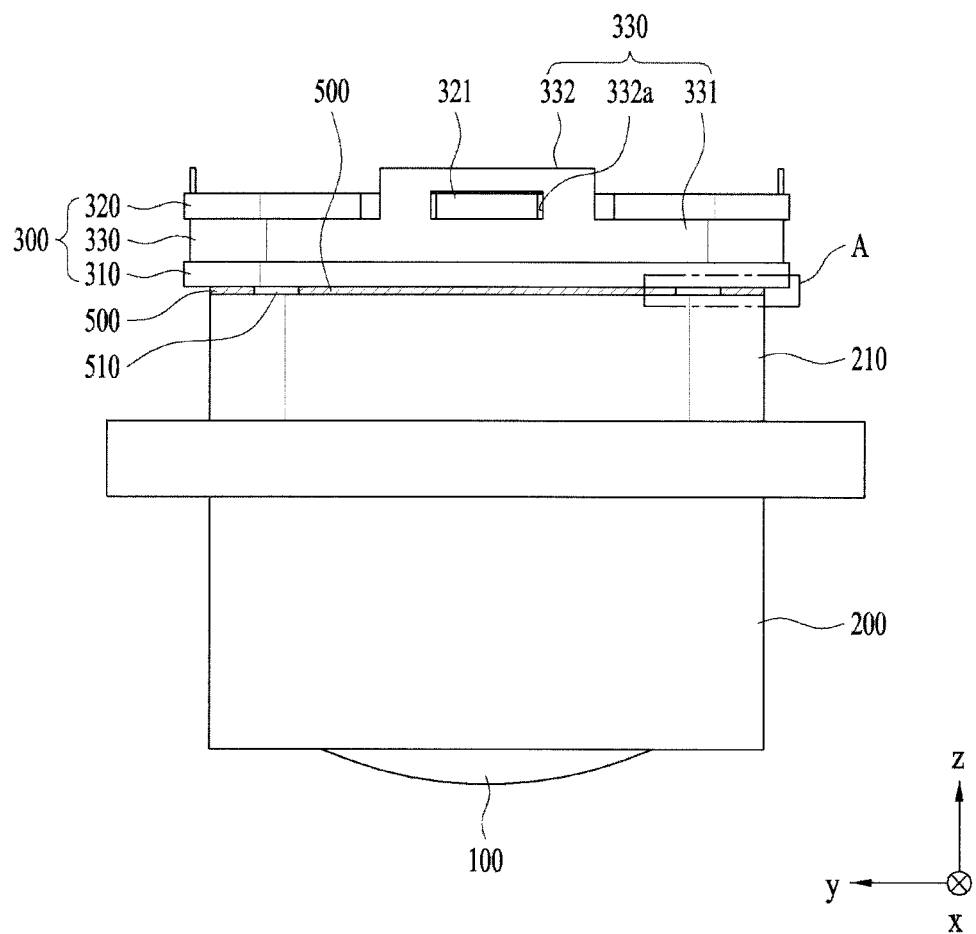
FIG. 4 is a side view illustrating the camera module according to one embodiment with a rear body removed therefrom.
Figure 5:
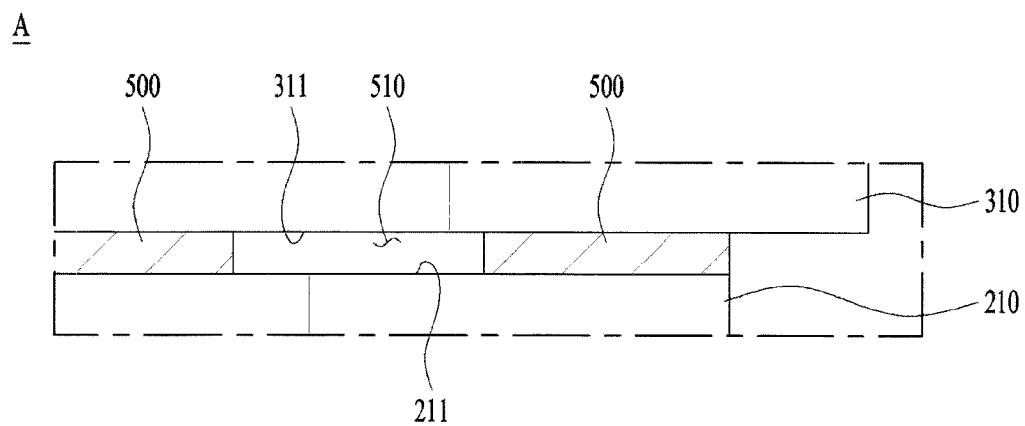
FIG. 5 is an enlarged view of portion A in FIG. 4.

FIG. 4 is a side view illustrating the camera module according to one embodiment with the rear body 600 removed therefrom. FIG. 5 is an enlarged view of portion A in FIG. 4.

The first adhesion unit 500 may be disposed between the front body 200 and the board unit 300. The first adhesion unit 500 may serve to cause the front body 200 and the board unit 300, for example, the first board 310, to be adhered or coupled to each other.

At least one through-hole 510 may be formed between the front body 200 and the board unit 300, which will be described later.

The front body 200 may include a first protruding portion 210, which protrudes toward the board unit 300, and a first adhesion surface 211, which is provided at the distal end of the first protruding portion 210. Here, the first adhesion surface 211 may be the distal end surface of the first protruding portion 210.

The first board 310 may include a second adhesion surface 311, which is provided at a portion thereof that faces the first adhesion surface 211. Here, the second adhesion surface 311 may be the surface of the first board 310 on which the image sensor 400 is disposed.

The first adhesion unit 500 may be formed by applying an adhesive to the first adhesion surface 211 or to the second adhesion surface 311. That is, the first adhesion unit 500 may be formed by applying an adhesive only to the first adhesion surface 211, only to the second adhesion surface 311, or to both the first adhesion surface 211 and the second adhesion surface 311.

In the case in which the first adhesion unit 500 is formed by applying an adhesive only to the second adhesion surface 311, it is desirable that the adhesive be applied to the second adhesion surface 311 in a shape corresponding to the shape of the first adhesion surface 211.

The through-hole 510, as illustrated in FIGS. 4 and 5, may be formed in a portion of the first adhesion unit 500. That is, the first adhesion unit 500 may be formed by applying an adhesive to a portion of the first adhesion surface 211 and/or the second adhesion surface 311 such that the portion not applied with the adhesive becomes the through-hole 510, rather than applying an adhesive to the first adhesion surface 211 and/or the second adhesion surface 311 in the shape of a single completely closed curve.

The adhesive applied to the first adhesion surface 211 and/or the second adhesion surface 311 may have the shape of a single closed curve or a simple closed curve. Alternatively, the adhesive applied to the first adhesion surface 211 and/or the second adhesion surface 311 may have the shape of a single open curve.

That is, the adhesive may be applied to the first adhesion surface 211 and/or the second adhesion surface 311 in a shape such that at least one portion of a single closed curve is cut. Alternatively, the adhesive may be applied to the first adhesion surface 211 and/or the second adhesion surface 311 in the shape of one or more open curves or two or more line segments.

As such, since the adhesive is applied in the shape of one open curve, two or more open curves, or one or more line segments, the portion not applied with the adhesive may become the through-hole 510 when the front body 200 and the first board 310 are coupled to each other. As a result, the first adhesion unit 500 may have an open curve shape.

The through-hole 510 may be filled after curing the adhesive. Because the reason for forming the through-hole 510 is to discharge internal gas, which expands during epoxy heat-curing treatment in a PCB active alignment process to be described later, to the outside, the through-hole 510 may be filled after the curing is completed in order to prevent the introduction of foreign substances from the outside.

The through-hole 510 may be filled by additionally applying an adhesive thereto or putting tape thereon. However, any one of various other methods may be used, so long as it can fill the through-hole 510 that has been formed.

Since the front body 200 and the rear body 600 are coupled to each other after the front body 200 and the board unit 300 are coupled to each other and since the through-hole 510 is formed in the first adhesion unit 500, when the first adhesion unit 500 is heated to be cured, a portion of the air that is present in the space formed by the front body 200 and the board unit 300 and expands due to the heat may move outside through the through-hole 510.

That is, the through-hole 510 causes the space formed by the front body 200 and the board unit 300 and the external space to communicate with each other. Thus, when the air present in the space formed by the front body 200 and the board unit 300 is heated and expands, a portion of the air may move to the external space through the through-hole 510.

With this configuration, even when the first adhesion unit 500 is heated, it is possible to prevent deformation of the board unit 300 or variation in the focal length of the camera module, which may be caused by expansion of the air present in the space formed by the front body 200 and the board unit 300.

In the embodiment, when the air occupying the space formed by the front body 200 and the board unit 300 expands while the first adhesion unit 500 is heated to be cured, a portion of the air moves outside through the through-hole 510, thereby preventing the focal length of the camera module from exceeding a design range and preventing the first adhesion unit 500 or the board unit 300 from being deformed or damaged due to expansion of the air.

Meanwhile, due to the first adhesion unit 500, the coupling between the front body 200 and the board unit 300 may be performed through an active alignment process. In order to facilitate the active alignment process, the first adhesion unit 500 may be embodied as an adhesive made from a thermosetting and UV-curing material.

In the embodiment, the active alignment process is a process of adjusting the focal length between the lens unit 100 and the image sensor 400, which face each other, by moving the board unit 300 in the first direction or a process of adjusting the focal length between the lens unit 100 and the image sensor 400 by tilting, i.e. rotating, the board unit 300 in the x-y plane, which is perpendicular to the first direction.

In order to realize the active alignment process, it may be desirable for the first adhesion unit 500 to be provisionally cured during the active alignment process and to be permanently cured after the provisional curing.

Therefore, for example, a hybrid adhesive, which reacts both to ultraviolet light and to heat and is cured, may be used as the adhesive forming the first adhesion unit 500.

During the active alignment process, in the state in which the focal length between the lens unit 100 and the image sensor 400 is adjusted, the first adhesion unit 500 may be provisionally cured by radiating ultraviolet light to the first adhesion unit 500.

After the provisional curing, the first adhesion unit 500 may be permanently cured by heating the same. For example, the first adhesion unit 500 may be heated in an oven or the like. A method of assembling the camera module, including the active alignment process, will be described later in detail with reference to the drawings.

Figure 6:
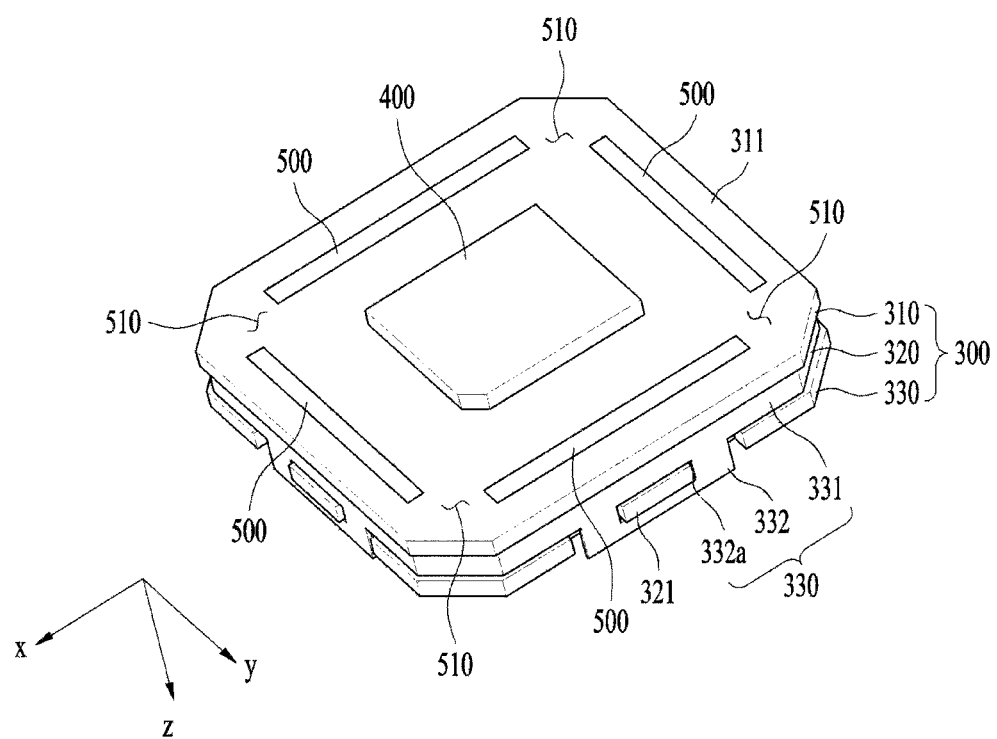
FIG. 6 is a view illustrating a board unit and a first adhesion unit according to one embodiment.
Figure 7:
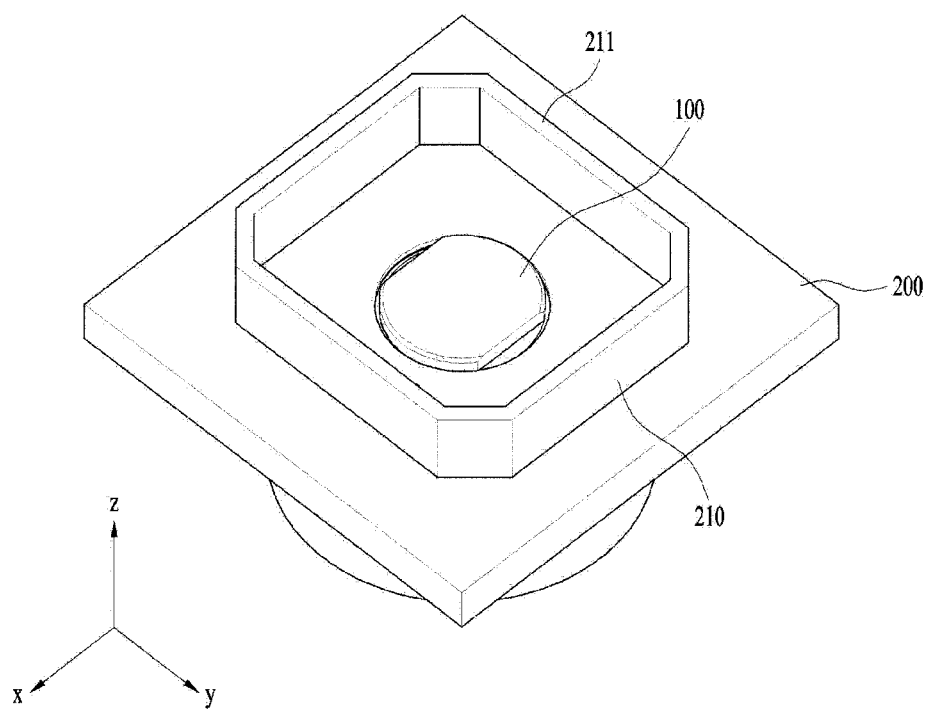
FIG. 7 is a view illustrating a lens unit and a front body according to one embodiment.

FIG. 6 is a view illustrating the board unit 300 and the first adhesion unit 500 according to one embodiment. FIG. 7 is a view illustrating the lens unit 100 and the front body 200 according to one embodiment.

As illustrated in FIG. 7, the first adhesion surface 211 or the second adhesion surface may have an overall rectangular shape. In one embodiment, the first adhesion surface 211 may have an octagonal shape including long sides and short sides when viewed in the first direction. As illustrated in FIG. 6, the adhesion unit 500 may have a shape corresponding to the shape of the first adhesion surface. For example, the adhesion unit 500 may have an octagonal or overall rectangular shape, which corresponds to the shape of the first adhesion surface 211.

Although the first adhesion unit 500 is illustrated in FIG. 6 as being formed by applying an adhesive to the second adhesion surface 311, in another embodiment, the first adhesion unit 500 may be formed by applying an adhesive to the first adhesion surface 211 or by applying an adhesive to both the first adhesion surface 211 and the second adhesion surface 311.

As illustrated in FIG. 6, the through-hole 510 may be formed in the short side of the first adhesion unit 500. In another embodiment, although not illustrated, the through-hole 510 may be formed in the long side of the first adhesion unit 500.

Although it is illustrated in FIG. 6 that four through-holes 510 are formed at positions symmetrical to each other in the first adhesion unit 500, the number and positions of through-holes 510 may be variously selected.

Meanwhile, in order to increase the coupling force between the first adhesion surface 211 and the first adhesion unit 500, it may be desirable to increase the surface roughness of the first adhesion surface 211. The surface roughness of the first adhesion surface 211 may be increased by making the first adhesion surface 211 uneven.

For example, the surface roughness of the first adhesion surface 211 may be increased through mechanical machining. In another embodiment, in the case in which the first protruding portion 210 is made from a metal material, an oxide film may be formed on the first adhesion surface 211.

At this time, the oxide film may be formed by corroding the surface of the first adhesion surface 211. The surface roughness of the first adhesion surface 211 may be increased by the oxide film, and consequently, the coupling force between the first adhesion surface 211 and the first adhesion unit 500 may be increased.

The increase in surface roughness to increase the coupling force between the first adhesion surface 211 and the adhesion unit 500 may also be applied to the second adhesion surface in the same manner for the same purpose.

Figure 8:
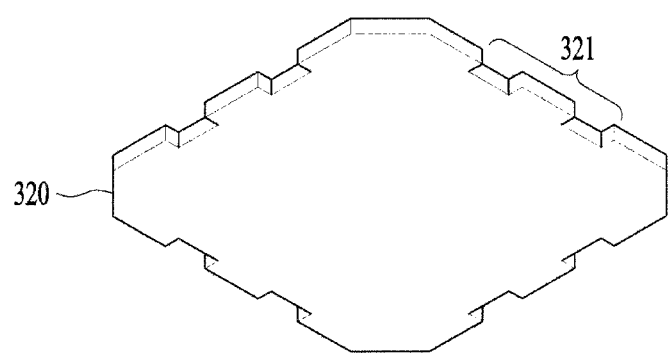
FIG. 8 is an exploded perspective view illustrating a board unit according to one embodiment.
Figure 8:
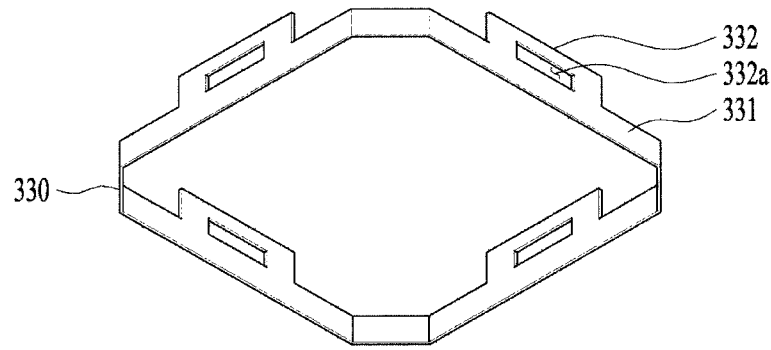
Figure 8:
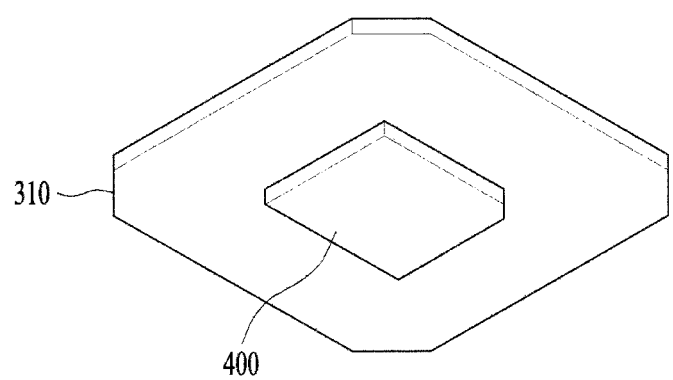

FIG. 8 is an exploded perspective view illustrating the board unit 300 according to one embodiment. Illustration of the first adhesion unit 500 is omitted from FIG. 8 for clarity. As illustrated in FIG. 8, the board-fixing member 330 may include a spacing portion 331, a first coupling portion 332, and a slot 332*a*. The second board 320 may include a second coupling portion 321.

The spacing portion 331 may be disposed between the first board 310 and the second board 320 and may serve to space the first board 310 and the second board 320 apart from each other. The first board 310 and the second board 320 are spaced apart from each other by the spacing portion 331 in the first direction, thereby preventing damage to the elements or a short circuit between the circuit wirings attributable to contact between the first board 310 and the second board 320.

The first coupling portion 332 may be coupled to the second board 320. Specifically, the first coupling portion 332 may be coupled to the second coupling portion 321 provided at the side surface of the second board 320.

As illustrated in FIG. 8, the second board 320 may be provided at the side surface thereof with the second coupling portion 321 having an uneven shape, and the first coupling portion 332 may have therein the slot 332*a*, in which the second coupling portion 321 is fitted.

Since the first coupling portion 332 is coupled to the second coupling portion 321, the board-fixing member 330 is prevented from moving freely in the first direction, the second direction and the third direction relative to the second board 320. As a result, the first board 310 and the second board 320 may be stably maintained in a spaced-apart state.

Meanwhile, one end of the board-fixing member 330 may be disposed on the surface of the first board 310 that is opposite the surface on which the image sensor 400 is installed, and may be coupled thereto using an adhesive or soldering.

In order to prevent the board-fixing member 330 from freely moving in the first direction, the second direction and the third direction, for example, as illustrated in FIG. 8, it is desirable that the first coupling portion 332 be provided in a plural number so as to be located at positions symmetrical to each other. Further, it is desirable that the second coupling portion 321 be provided in the same number as the number of first coupling portions 332.

FIGS. 9 to 14 are flowcharts showing the method of assembling the camera module. Hereinafter, the method of assembling the camera module according to the embodiment will be described with reference to the active alignment process by which the board unit 300 is coupled to the front body 200.

When the board unit 300 is coupled to the front body 200, it is desirable that the focal point of the lens unit 100 coupled to the front body 200 be located at an optimum position within the image sensor 400 installed on the board unit 300. Thus, in the embodiment, a plurality of pieces of information about the focal point may be obtained while adjusting the location of the focal point of the lens unit 100 through the active alignment process, and an optimum position for the focal point may be selected. The board unit 300 may be coupled to the front body 200 based on the selected position.

In the method of assembling the camera module according to the embodiment, the front body 200, to which the lens unit 100 is coupled, may be fixed, and the board unit 300 may be provided so as to be movable relative to the front body 200 during the camera module assembly process. In another embodiment, the board unit 300 may be fixed, and the front body 200, to which the lens unit 100 is coupled, may be provided so as to be movable.

That is, during at least some of the camera module assembly processes, the board unit 300 or the front body 200 may be provided so as to be rotatable about axes parallel to the first direction, the second direction and the third direction and to be parallel movable in the first direction, the second direction and the third direction. This may be realized by an assembly device for performing the active alignment process.

The camera module assembly method may include a preparation step S100, an adhesive application step S200, a focal point adjustment step, and an adhesive-curing step S500. Alternatively, the camera module assembly method may include a preparation step S100, an adhesive application step S200, a focal point adjustment step, an adhesive-curing step S500, and a through-hole adhesive application and curing step S600.

In addition, after the adhesive application step S200 is completed, an alignment step may be performed. In the alignment step, the adhesive may be located between a first surface of the front body 220 and a second surface of the board unit. At this time, the first surface and the second surface are surfaces that face each other and are coupled to each other by the adhesive.

The focal point adjustment step may be performed once or may be performed twice or more. In one embodiment, the focal point adjustment step may include a first focal point adjustment step S300 and a second focal point adjustment step S400. Of course, the focal point adjustment step may be performed only once. However, the focal point adjustment step may be divided into a first step and a second step for more precise adjustment of the focal point.

Figure 9:
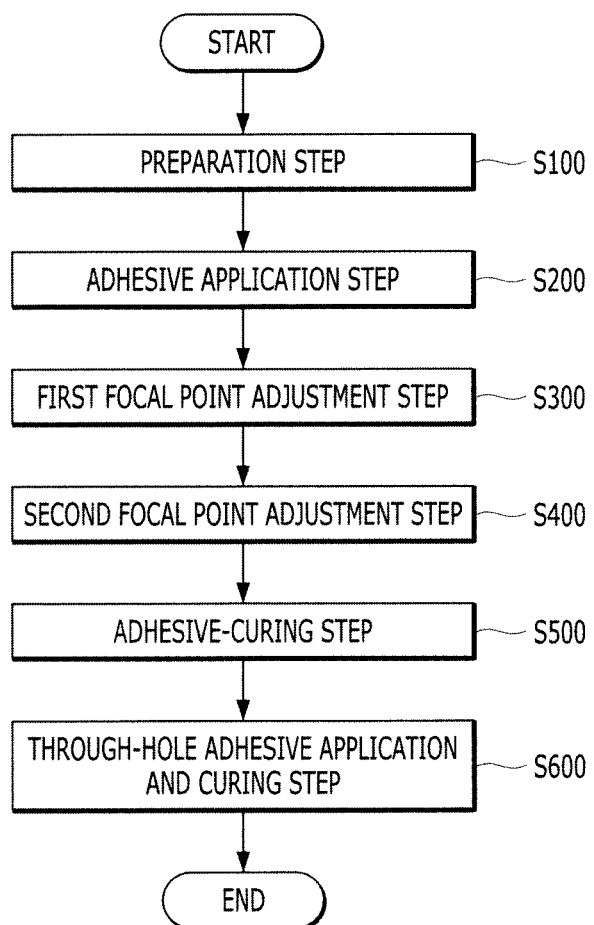
FIGS. 9 to 14 are flowcharts showing a method of assembling the camera module.
Figure 10:
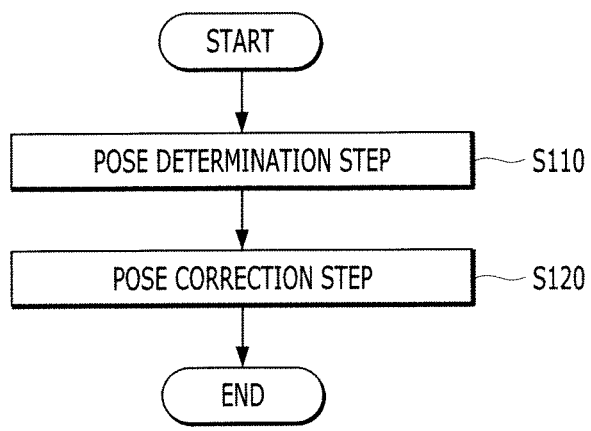

As illustrated in FIG. 9, the method may include the preparation step S100, the adhesive application step S200, the first focal point adjustment step S300, the second focal point adjustment step S400, and the adhesive-curing step S500. In addition, the method may further include the through-hole adhesive application and curing step S600.

The preparation step S100 may include a pose determination step S110 and a pose correction step S120.

In the pose determination step S110, the pose of the front body 200 or the board unit 300 may be determined. Specifically, it may be determined whether the board unit 300 or the front body 200 is located at a reference position based on predetermined reference values.

In one embodiment, the pose of the board unit 300 or the front body 200 may be determined by measuring the angle at which the board unit 300 or the front body 200 is tilted with respect to axes parallel to at least one direction and/or the distance that the board unit 300 or the front body 200 is spaced in at least one direction based on the predetermined reference values.

Specifically, the pose of the board unit 300 or the front body 200 may be determined by measuring the angle at which the board unit 300 or the front body 200 is tilted with respect to axes parallel to the first direction, the second direction and the third direction and the distance that the board unit 300 or the front body 200 is spaced in the first direction, the second direction and the third direction based on the predetermined reference values. In the pose determination step S100, the pose may be determined using a camera.

If it is determined in the pose determination step S110 that the position of the board unit 300 or the front body 200 is different from a predetermined reference position based on the measured tilting angle and/or the spacing distance, the board unit 300 or the front body 200 may be moved to the predetermined reference position to be corrected in pose in the pose correction step S120.

At this time, the board unit 300 or the front body 200 may be rotated to an angle at which the board unit 300 or the front body 200 is tilted with respect to an axis parallel to at least one direction, or may be parallel moved in at least one direction so as to match the predetermined reference values. In one embodiment, the board unit 300 or the front body 200 may be rotated about axes parallel to the first direction, the second direction and the third direction, and may be parallel moved in the first direction, the second direction and the third direction.

Figure 11:
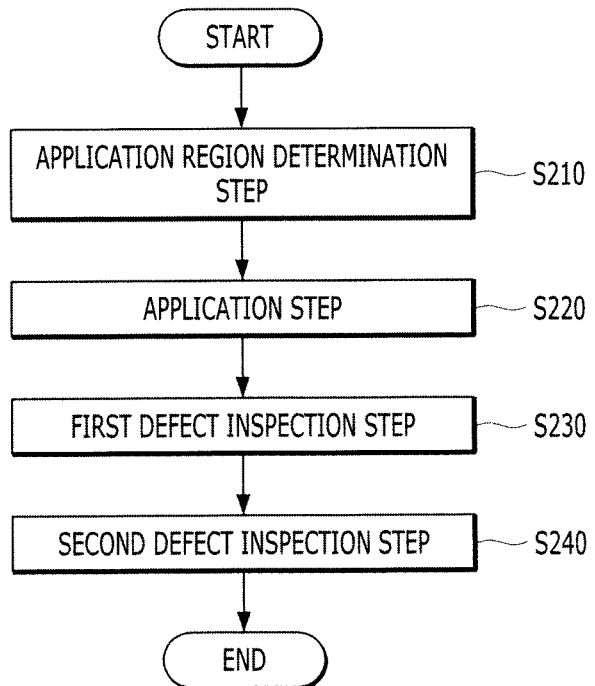

In the adhesive application step S200, an adhesive may be applied to the first adhesion surface 211 formed at the front body 200 or to the second adhesion surface 311 formed at the board unit 300. As illustrated in FIG. 11, the adhesive application step S200 may include an application region determination step S210, the application step S220, and a defect inspection step. The defect inspection step may include a first defect inspection step S230 and a second defect inspection step S240.

In the application region determination step S210, the application region of the adhesive may be determined. Specifically, in the camera module according to the embodiment, the first adhesion surface 211 or the second adhesion surface 311 may be the application region of the adhesive.

In the application region determination step S210, the region of the first adhesion surface 211 and/or the second adhesion surface 311 to which the adhesive is actually applied may be determined. The region to which the adhesive is applied may be determined using a camera.

In the case in which an adhesive application device is used, information about the application region may be prestored in the adhesive application device. Thus, the first adhesion surface 211 and/or the second adhesion surface 311 may be completely located at the predetermined position in the preparation step S100, and the adhesive application device may apply the adhesive to the predetermined application region of the first adhesion surface 211 and/or the second adhesion surface 311.

In the application step S220, the adhesive may be applied to the application region. In the camera module according to the embodiment, it is desirable that the adhesive application device be used in consideration of a small application area and rapid performance of the application process.

The defect inspection step may be performed after the application step S220. In the defect inspection step, it may be inspected whether the adhesive was applied to the predetermined application region, whether the adhesive was evenly applied, whether an optimum amount of adhesive was applied, or whether the image sensor 400 is defective.

A defect of the image sensor 400 may be caused by the application of the adhesive. For example, it may be determined whether a portion of the image sensor 400 is stained with epoxy. The defect inspection step may include a plurality of defect inspection steps. In one embodiment, the defect inspection step may be divided into a first defect inspection step S230 and a second defect inspection step S240.

In the first defect inspection step S230, it may be inspected whether the applied adhesive is defective. Specifically, in the first defect inspection step S230, it may be inspected whether the adhesive was applied to the predetermined application region, whether the adhesive was evenly applied, or whether an optimum amount of adhesive was applied. When the applied adhesive is found to be defective, the application may be performed again or additionally in order to eliminate the defect.

In the second defect inspection step S240, it may be determined whether the image sensor 400 is defective. Because the adhesive may also be applied to the image sensor 400 during the adhesive application process, it is necessary to inspect whether the image sensor 400 is defective due to application of the adhesive to the image sensor 400.

Specifically, in the second defect inspection step S240, it may be inspected whether a pixel provided at the image sensor 400 is damaged, whether the adhesive was applied to the surface of the image sensor 400, or whether the image sensor 400 operates normally. When the image sensor 400 is found to be defective, the defect may be eliminated using an appropriate method. In addition, the second defect inspection step S240 may include the processes of the first defect inspection step S230.

The focal point adjustment step may be performed once, or may be performed twice or more. In one embodiment, the focal point adjustment step may include a first focal point adjustment step S300 and a second focal point adjustment step S400.

In the first focal point adjustment step S300, information about the focal points at various positions may be obtained by adjusting the position of the board unit 300, the position of the board unit 300 and/or the front body 200 may be determined based on the obtained information about the focal points, and the front body 200 may be located at the determined position by adjusting the position of the board unit 300 or the front body 200 in consideration of the determined position.

Figure 12:
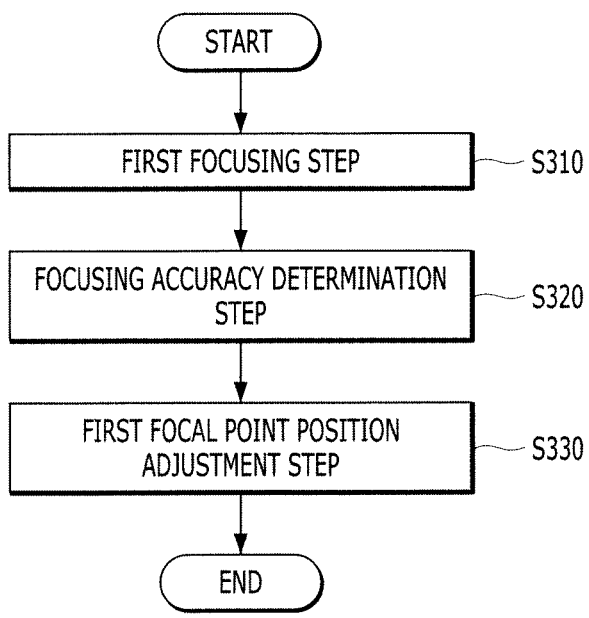

In the first focal point adjustment step S300, the focal point of the lens unit 100 may be located within the active region of the image sensor 400. As illustrated in FIG. 12, the first focal point adjustment step S300 may include a first focusing step S310, a focusing accuracy determination step S320, and a first focal point position adjustment step S330.

In the first focusing step S310, the focus of the camera module may be adjusted. Specifically, in the first focusing step S310, the focal point of the lens unit 100 may be located within the active region of the image sensor 400 by moving the board unit 300 in at least one direction, e.g. in the first direction.

After the first focusing step S310, in the focusing accuracy determination step S320, an appropriate focusing position may be determined based on the information obtained in the first focusing step S310. The focusing accuracy determination step S320 may be performed simultaneously with or in the middle of the first focusing step S310. Alternatively, the focusing accuracy determination step S320 may be performed after the first focusing step S310 is completed.

In the focusing accuracy determination step S320, it may be determined whether the focal point of the lens unit 100 is located within the active region of the image sensor 400. At this time, a determination as to whether the focal point of the lens unit 100 is located within the active region of the image sensor 400 may be made by measuring a spatial frequency response (SFR) value of the camera module.

When the SFR value exceeds a predetermined range, the first focusing step S310 may be performed again so that the SFR value falls within the predetermined range.

In the first focal point adjustment step S330, the focal point of the lens unit 100 may be located within the active region of the image sensor 400 by parallel moving the board unit 300 in at least one direction and/or by rotating the board unit 300 about at least one axis.

In the first focusing step S310, the focal point of the lens unit 100 may be located within the active region of the image sensor 400 by adjusting the same in at least one direction, e.g. in the first direction.

In the first focal point position adjustment step S330, the focal point of the lens unit 100 may be located within the active region of the image sensor 400 by adjusting the same in at least one direction. In one embodiment, the focal point of the lens unit 100 may be located within the active region of the image sensor 400 by adjusting the lens unit 100 in the first direction, the second direction and the third direction.

To this end, in one embodiment, the board unit 300 may be parallel moved in the first direction, the second direction and the third direction, and may be rotated about axes parallel to the first direction, the second direction and the third direction.

After the first focal point position adjustment step S330 is performed, the SFR value may be measured again. When the SFR value exceeds the predetermined range, the first focal point position adjustment step S330 may be performed again so that the SFR value falls within the predetermined range.

Through the first focusing step S310 and the first focal point position adjustment step S330, the focal point of the lens unit 100 may be located within the active region of the image sensor 400 when viewed in the first direction, the second direction and the third direction.

In the second focal point adjustment step S400, the position in the image sensor 400 at which the focal point of the lens unit 100 is located may be adjusted by parallel moving the board unit 300 or the front body 200 in at least one direction or by rotating the board unit 300 or the front body 200 about at least one axis.

In one embodiment, the position in the image sensor 400 at which the focal point of the lens unit 100 is located may be adjusted through the parallel movement and rotation of the board unit 300.

Figure 13:
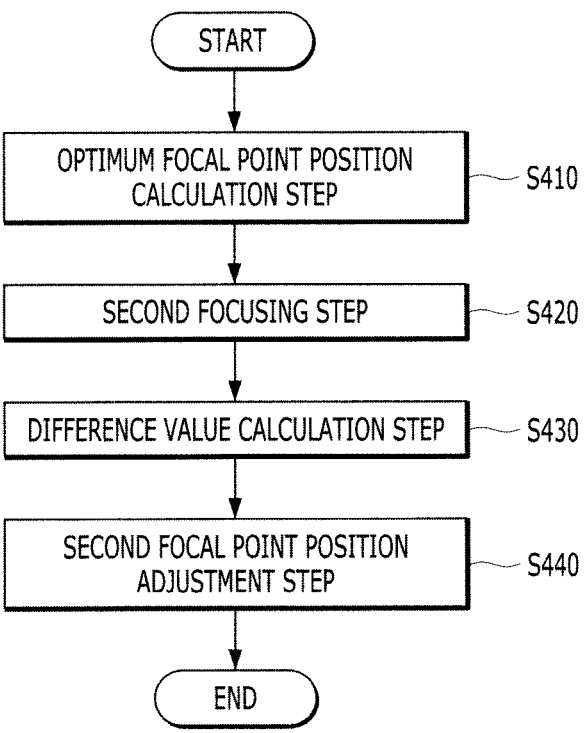

As illustrated in FIG. 13, the second focal point adjustment step S400 may include a second focusing step S420, a difference value calculation step S430, and a second focal point position adjustment step S440. In addition, the second focal point adjustment step S400 may further include an optimum focal point position calculation step S410.

In the optimum focal point position calculation step S410, the optimum focal point position of the lens unit 100 may be calculated by measuring the SFR value of the camera module. That is, after the first focal point adjustment step S300 is completed, the SFR value of the camera module may be measured, and the optimum focal point position of the lens unit 100 with respect to the image sensor 400 may be calculated based on the measured value.

At this time, a plurality of SFR values may be measured from various portions of an image captured by the image sensor 400. For example, one of the measured SFR values at which the quality of the image is the best may be selected, and the optimum focal point position may be calculated based on the selected value.

That is, the calculated optimum focal point position is the position at which the one of the measured SFR values at which the quality of the image is the best appears over the entire image.

In the second focusing step S420, the focus of the camera module may be adjusted, and an SFR value may be measured. Specifically, in the second focusing step S420, the focal point of the lens unit 100 may be moved within the active region of the image sensor 400 by moving the board unit 300 in at least one direction, e.g. in the first direction.

The first focusing step S310 is a step of locating the focal point of the lens unit 100 to a position within the active region of the image sensor 400, whereas the second focusing step S420 is a step of moving the focal point of the lens unit 100 within the active region of the image sensor 400. Thus, in the second focusing step S420, the distance that the board unit 300 moves in the first direction is shorter and the board unit 300 needs to move more precisely than in the first focusing step S310.

In the difference value calculation step S430, a difference value between the optimum focal point position of the lens unit 100, calculated in the optimum focal point position calculation step S410, and the focal point position of the lens unit 100, measured in the second focusing step S420, may be calculated.

In the second focal point position adjustment step S440, the focal point of the lens unit 100 may be located at the optimum focal point position by removing the difference value in the focal point position of the lens unit 100 through the parallel movement and/or rotation of the board unit 300.

That is, in the second focal point position adjustment step S440, the board unit 300 may be rotated about axes parallel to the first direction, the second direction and the third direction, and may be parallel moved in the first direction, the second direction and the third direction, with the result that the focal point of the lens unit 100 may be located at the optimum focal point position or may be located at a position that is spaced apart from the optimum focal point position within a predetermined error range.

In the adhesive-curing step S500, the adhesive may be cured using ultraviolet light and heat. The adhesive-curing step S500 may include at least one SFR value measurement step, at least one board unit moving step, and at least one curing step.

Figure 14:
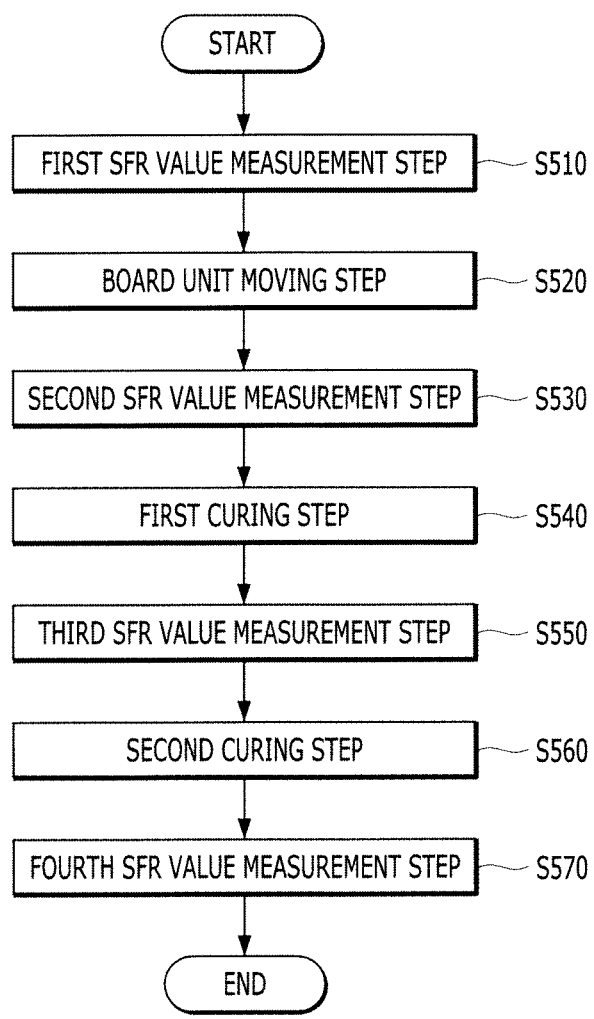

In one embodiment, as illustrated in FIG. 14, the curing step S500, in which the adhesive is cured using ultraviolet light and heat, may include a first SFR value measurement step S510, a board unit 300 moving step S520, a second SFR value measurement step S530, a first curing step S540, a third SFR value measurement step S550, a second curing step S560, and a fourth SFR value measurement step S570.

In the first SFR value measurement step S510, the focal point position of the lens unit 100 in the first direction may be determined by measuring the SFR value of the camera module.

In the board unit 300 moving step S520, the spacing distance between the lens unit 100 and the board unit 300 in the first direction may be adjusted by moving the board unit 300 in at least one direction, e.g. in the first direction.

In the second SFR value measurement step S530, it may be determined whether the board unit 300 has moved a predetermined distance in the first direction by measuring the SFR value of the camera module.

When the board unit 300 has moved excessively or insufficiently in the first direction, the board unit 300 moving step S520 and the second SFR value measurement step S530 may be repeated so that the board unit 300 moves a predetermined distance in the first direction.

In the first curing step S540, the adhesive may be provisionally cured by radiating ultraviolet light to the adhesive.

In the third SFR value measurement step S550, which is a separate SFR value measurement step different from the first SFR value measurement step S510, it may be determined whether the focal point position of the lens unit 100 in the first direction is the same as that measured in the first SFR value measurement step S510 or is located within an error range by measuring the SFR value of the camera module.

Even when the focal point position of the lens unit 100 in the first direction is determined to be out of the error range based on the comparison with that measured in the first SFR value measurement step S510, since the adhesive is still in a provisionally cured state, the board unit 300 moving step S520, the second SFR value measurement step S530 and the third SFR value measurement step S550 may be repeated so that the focal point position of the lens unit 100 in the first direction falls within the error range. If necessary, the first curing step S540 may also be repeated.

In the second curing step S560, the adhesive may be permanently cured by heating the adhesive.

After the second curing step S560, in the fourth SFR value measurement step S570, it may be finally determined whether the focal point position of the lens unit 100 in the first direction is the same as that measured in the first SFR value measurement step S510 or is located within the error range by measuring the SFR value of the camera module.

In addition, after the adhesive-curing step S500, the through-hole adhesive application and curing step S600 may be performed.

When a gas present in the internal space formed by the front body 200 and the first board 310 is subjected to heat curing in the adhesive-curing step S500, the internal gas may expand and cause various problems.

Therefore, the through-hole 510 may be formed in the first board 310 and/or the front body 200 in order to cause the space formed by the first board 310 and the front body 200 to communicate with other spaces, or the adhesive may be applied in an open curve shape so that the portion not applied with the adhesive becomes the through-hole 510, thereby discharging the thermally expanded internal gas outside.

However, because foreign substances may be introduced from the outside through the through-hole 510 after the heat-curing step, the through-hole 510 needs to be filled.

Thus, the through-hole adhesive application and curing step S600 may be further included to fill the through-hole 510 using an adhesive, tape or the like. For the adhesive, epoxy, specifically, UV-curing epoxy, may be used.

Through the through-hole adhesive application and curing step S600, a second adhesion unit may be formed to fill the through-hole 510.

According to the embodiment, since the front body 200 and the board unit 300 of the camera module are coupled to each other through the active alignment process, the focal point of the lens unit 100, which is coupled to the front body 200, may be located at an optimum position in the image sensor 400, which is installed on the board unit 300, and consequently, the quality of the image captured by the camera module may be improved.

Figure 15:
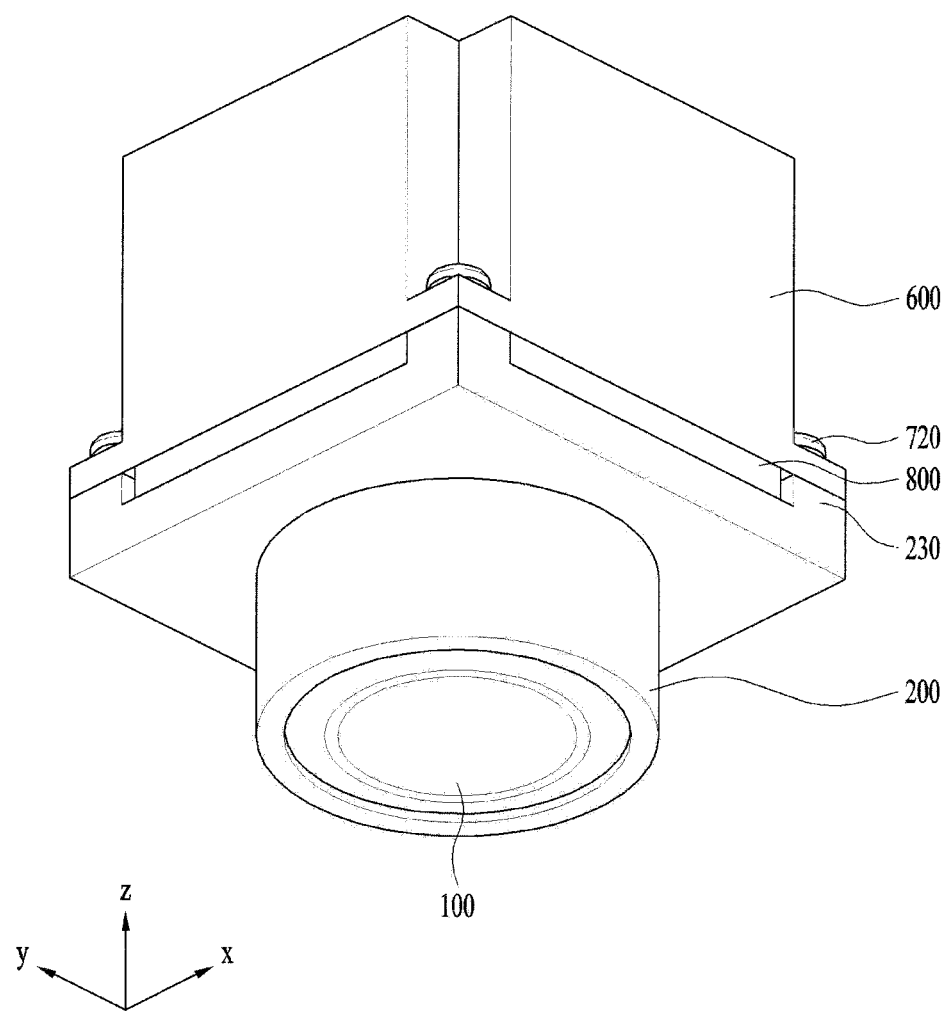
FIG. 15 is a perspective view illustrating a camera module according to another embodiment.
Figure 16:
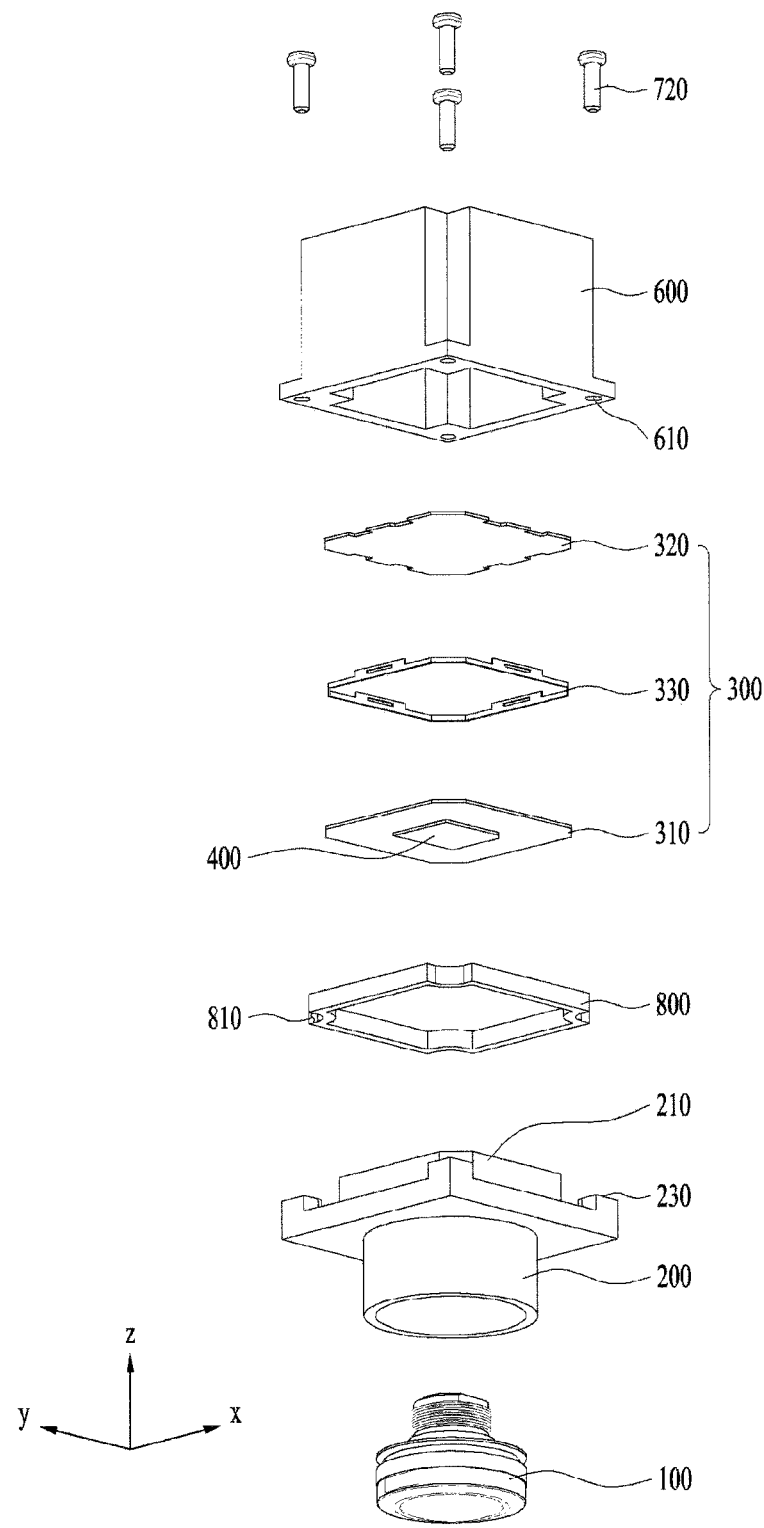
FIG. 16 is an exploded perspective view illustrating the camera module according to another embodiment.
Figure 17:
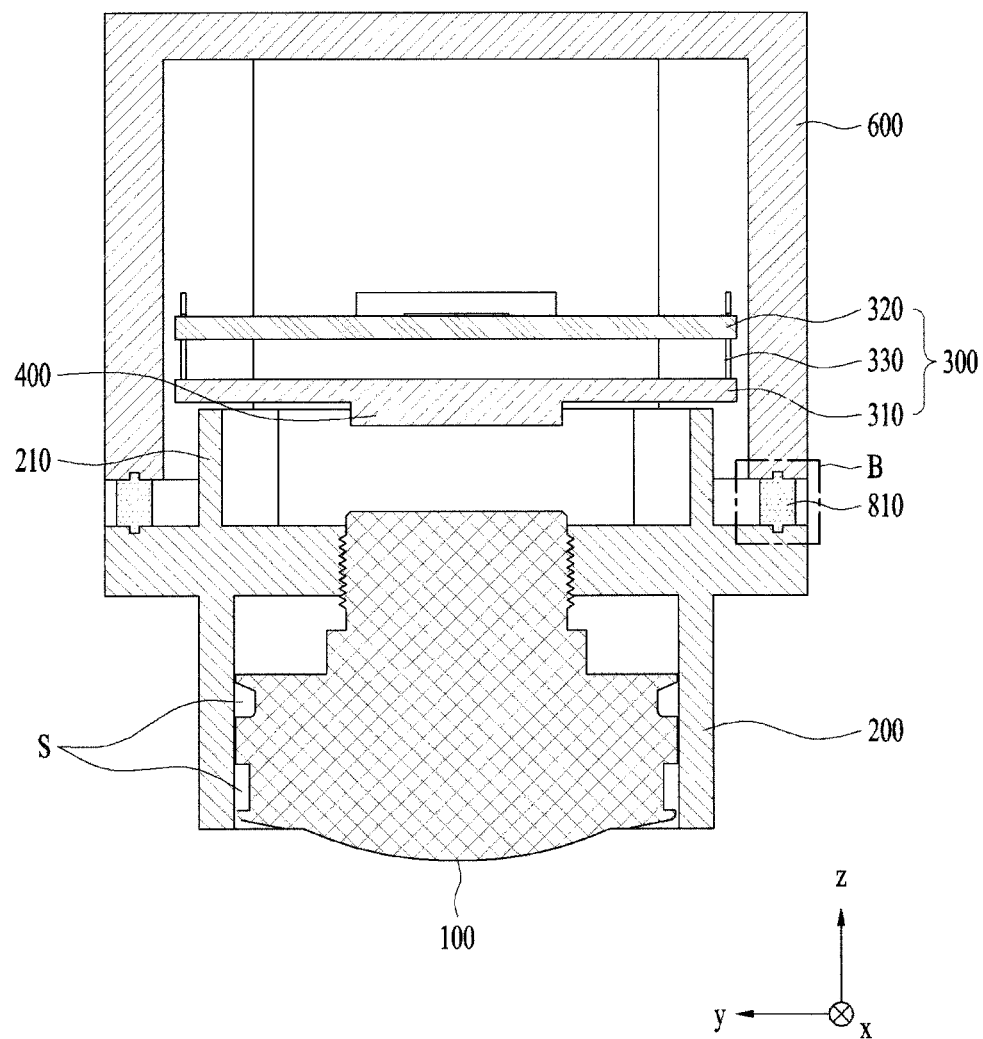
FIG. 17 is a cross-sectional view illustrating the camera module according to another embodiment.

FIG. 15 is a perspective view illustrating a camera module according to another embodiment. FIG. 16 is an exploded perspective view illustrating the camera module according to another embodiment. FIG. 17 is a cross-sectional view illustrating the camera module according to another embodiment.

The camera module according to another embodiment may include a second fastening member 720 and a gasket 800. In the embodiment, flanges of a front body 200 may be coupled to the end portion of a rear body 600 by the second fastening member 720.

The second fastening member 720 may be inserted at a portion thereof into the front body 200, and may serve to couple the front body 200 and the rear body 600 to each other. The second fastening member 720 may be, for example, a bolt, which is provided at one portion thereof with threads and is provided at the opposite portion thereof with a head to realize screw engagement.

In order to cause the one portion of the second fastening member 720 to be inserted into the front body 200, the front body 200 may be provided with a third protruding portion 230.

That is, the third protruding portion 230 may be provided at the front body 200 so as to protrude toward the rear body

600, and may have therein a second insertion hole 231 (refer to FIG. 18), into which the one portion of the second fastening member 720 is inserted. At this time, as illustrated in FIGS. 15 and 16, the third protruding portion 230 may be formed at each of the flanges of the front body 200.

As illustrated in FIGS. 15 and 16, in the configuration in which the front body 200 and the rear body 600 are coupled to each other by the second fastening member 720, the rear body 600 may have a third insertion hole 610 formed in each of the corners thereof, through which the second fastening member 720 passes.

In addition, an avoidance portion for securing an installation space of the second fastening member 720 may be formed adjacent to the portion of the rear body 600 in which the third insertion hole 610 is formed in the longitudinal direction of the rear body 600, i.e. in the first direction.

As described above, the rear body 600 may be coupled to the front body 200 to form a space for accommodating the board unit 300 and the image sensor 400.

In the case in which the front body 200 and the rear body 600 are coupled to each other by the second fastening member 720, the gasket 800 may be provided at the coupling region to prevent the introduction of foreign substances into the camera module.

The gasket 800 may be disposed between the front body 200 and the rear body 600 to seal the internal space in the camera module, thereby preventing foreign substances from being introduced into the internal space, in which the image sensor 400 and the board unit 300 are accommodated, through a gap in the coupling region between the front body 200 and the rear body 600. A detailed explanation of the gasket 800 will be made below.

Figure 18:
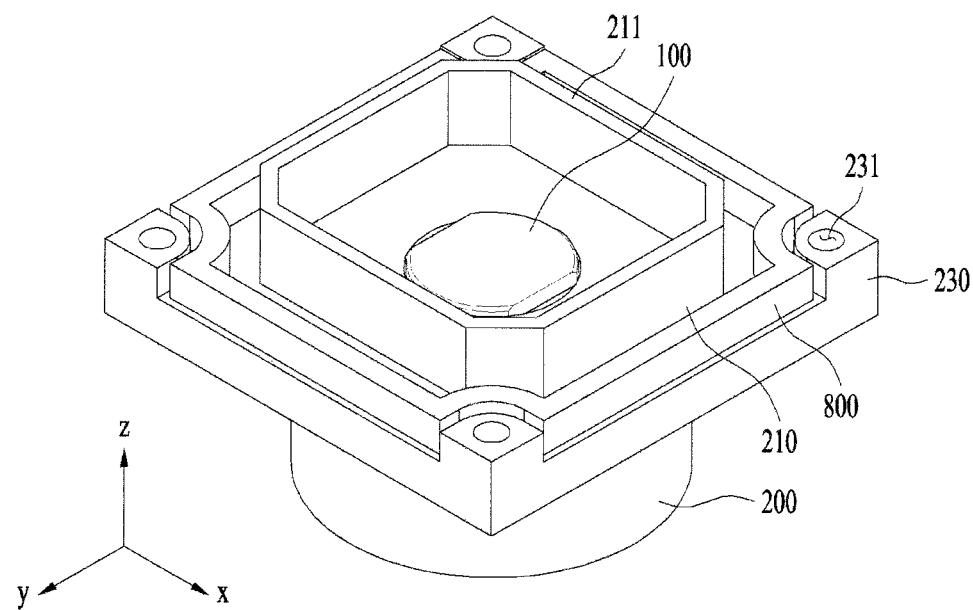
FIG. 18 is a perspective view illustrating a lens unit, a front body and a gasket according to another embodiment.
Figure 19:
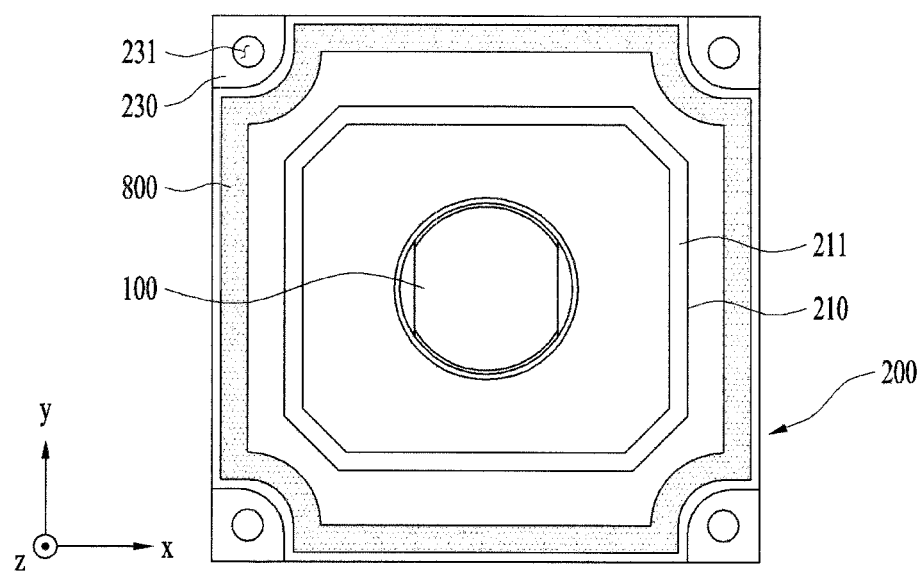
FIG. 19 is a plan view of FIG. 18.

FIG. 18 is a perspective view illustrating the lens unit 100, the front body 200 and the gasket 800 according to another embodiment. FIG. 19 is a plan view of FIG. 18. FIG. is a perspective view illustrating the gasket 800 according to one embodiment.

The gasket 800 may be disposed at the coupling region between the front body 200 and the rear body 600, and may serve to prevent foreign substances from being introduced into the internal space in the camera module, which is formed by the coupling of the front body 200 and the rear body 600 and in which the image sensor 400 and the board unit 300 are accommodated.

Figure 20:
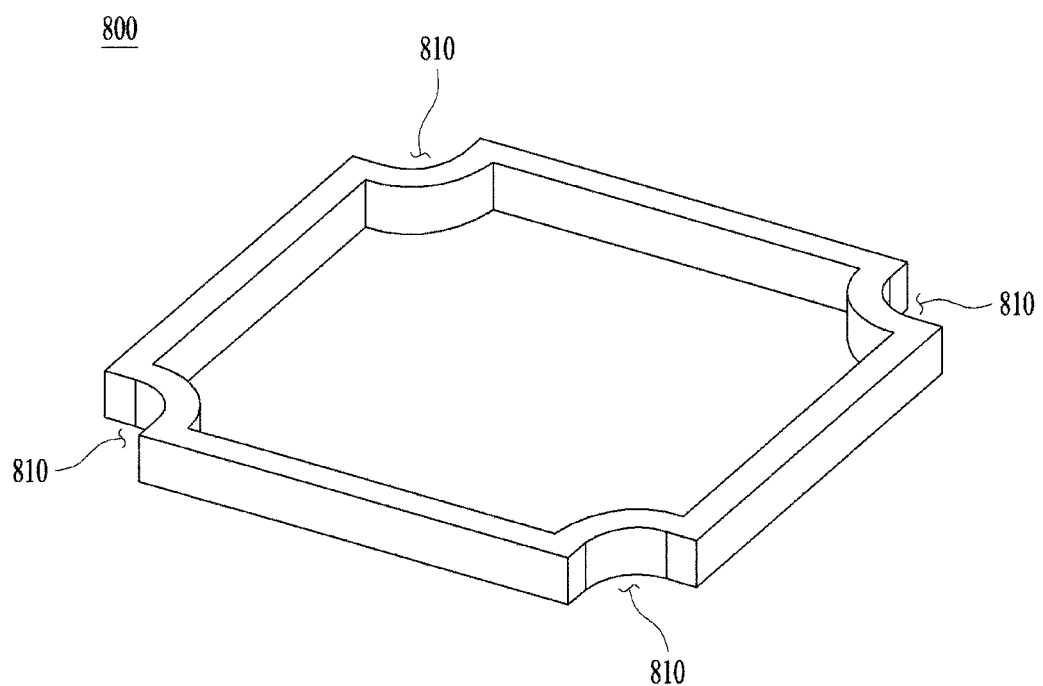
FIG. 20 is a perspective view illustrating a gasket according to one embodiment.

As illustrated in FIGS. 19 and 20, the gasket 800 may be provided with a second avoidance recess 810, which has a shape corresponding to the shape of the third protruding portion 230. Thus, the gasket 800 may be disposed between the front body 200 and the rear body 600 without interfering with the third protruding portion 230. Meanwhile, the gasket 800 may be made from a material having excellent sealing performance, e.g. silicon.

The gasket 800, as illustrated in FIG. 9, may be disposed in the front body 200 at a position further inward than the third protruding portion 230.

Thus, in the case in which the front body 200 and the rear body 600 are coupled to each other by the second fastening member 720, the introduction of foreign substances from the outside into the board unit 300 and into the image sensor 400 installed on the board unit 300 may be effectively prevented.

Figure 21:
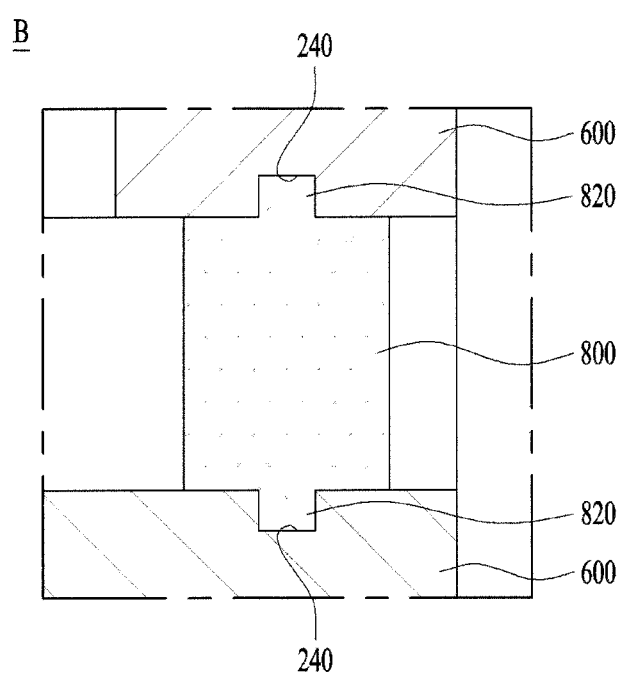
FIG. 21 is an enlarged view of portion B in FIG. 17.

FIG. 21 is an enlarged view of portion B in FIG. 17. As illustrated in FIG. 21, the gasket 800 may include a projection 820, which protrudes toward the front body 200 or the rear body 600 and extends in the longitudinal direction of the gasket 800.

In addition, the front body 200 or the rear body 600 may have a concave recess 240 formed at a position corresponding to the position of the projection 820 so as to have a shape corresponding to the shape of the projection 820.

When the gasket 800 is installed in the camera module in a manner such that the projection 820 is fitted into the concave recess 240, the gasket 800 may be prevented from being separated from the installation position set in the camera module. That is, since separation of the gasket 800 from the installation position set in the camera module is prevented, it is possible to prevent the introduction of foreign substances into the camera module attributable to separation of the gasket.

As illustrated in FIG. 21, the projection 820 is formed at each of the top surface and the bottom surface of the gasket 800 based on the drawing, and correspondingly, the concave portion 240 is formed in each of the front body 200 and the rear body 600. However, the disclosure is not limited thereto.

In another embodiment, the projection 820 may be formed at any one of the top surface and the bottom surface of the gasket 800, and correspondingly, the concave recess 240 may be formed in any one of the front body 200 and the rear body 600.

Figure 22:
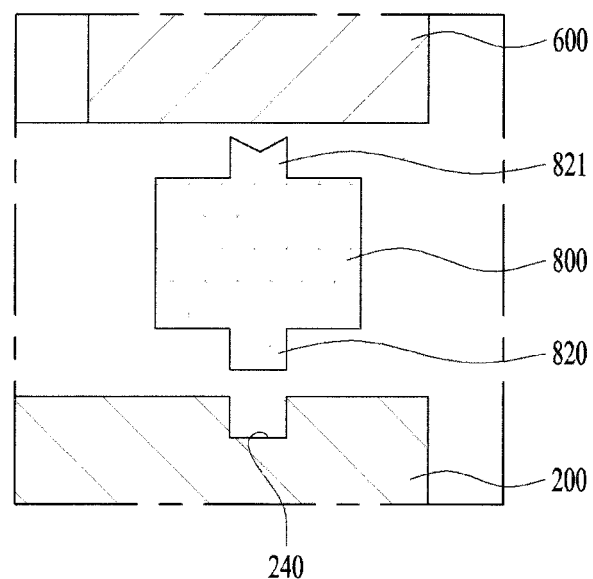
FIG. 22 is a view illustrating a gasket according to another embodiment.

FIG. 22 is a view illustrating a gasket 800 according to another embodiment. As illustrated in FIG. 22, the projection 820 may be embodied as a packing member 821. The packing member 821 may be made from an elastically deformable material, and may be deformed by being pressed by the front body 200 or the rear body 600.

When the front body 200 and the rear body 600 are coupled to each other, the gasket 800 may be installed in the camera module in a manner such that the packing member 821 is brought into contact with the front body 200 or the rear body 600 and is deformed by being pressed thereby. The portion of the front body 200 or the rear body 600 with which the packing member 821 is brought into contact may not be provided with the concave recess 240 shown in FIG. 21.

With this configuration, strong frictional force may be generated at the contact region between the packing member 821 and the front body 200 or the rear body 600. This frictional force may prevent the gasket 800 from being separated from the installation position set in the camera module.

As illustrated in FIG. 22, the gasket 800 is provided at one side thereof with the projection 820, embodied as the packing member 821, and is provided at the opposite side thereof with the projection 820 shown in FIG. 21. However, the disclosure is not limited thereto.

In another embodiment, the gasket 800 may not be provided with the projection 820 shown in FIG. 21 but may be provided only with the packing member 821. Further, the packing member 821 may be formed at each of both sides of the gasket 800 or may be formed only at one side of the gasket 800.

Hereinafter, a camera module according to another embodiment different from the above-described embodiments will be described. The constituent elements of the camera modules according to the respective embodiments set forth herein may be combined with each other.

Figure 23:
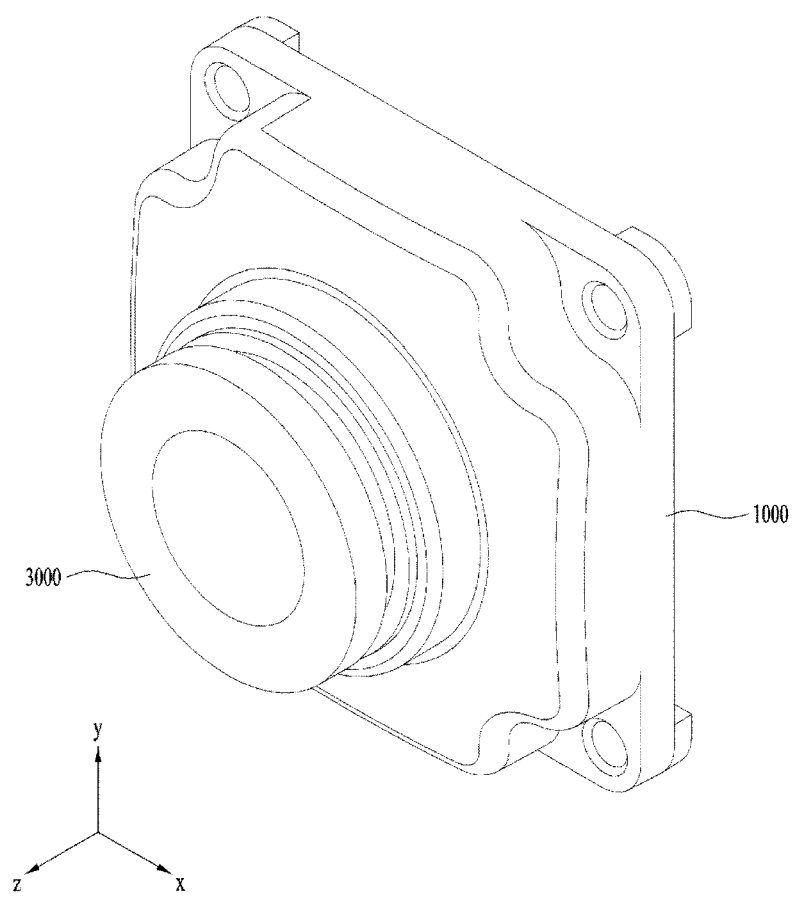
FIG. 23 is a perspective view illustrating a camera module according to one embodiment.
Figure 24:
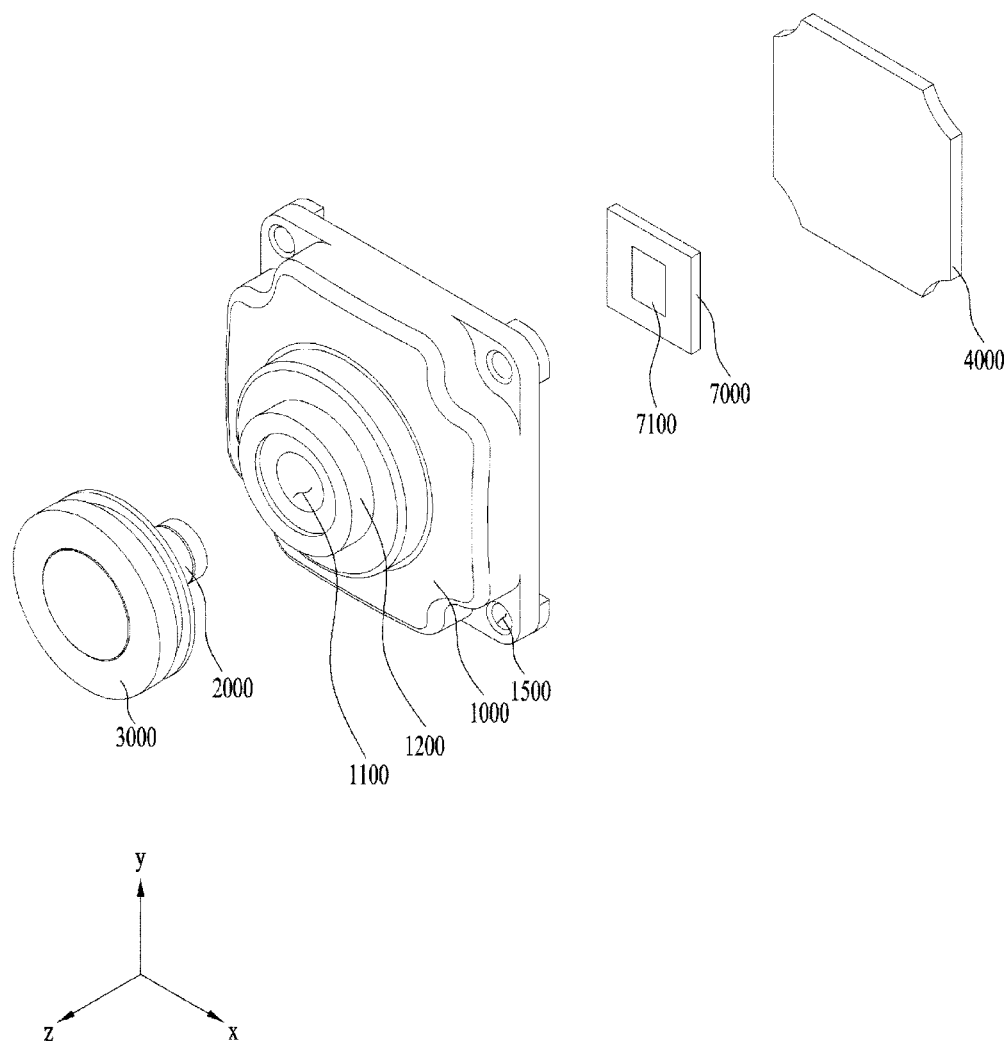
FIG. 24 is an exploded perspective view illustrating the camera module according to one embodiment.
Figure 25:
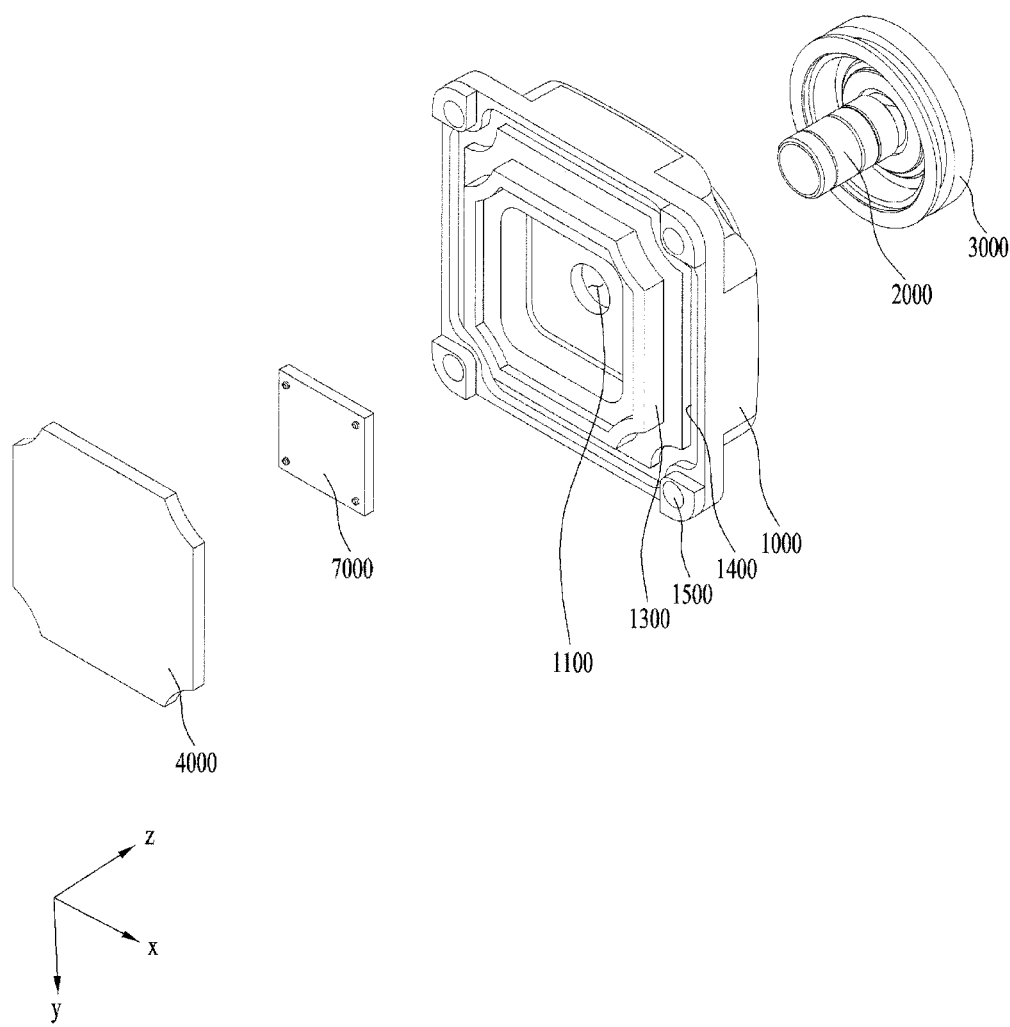
FIG. 25 is a view of the camera module in FIG. 24 when observed from a different direction.

FIG. 23 is a perspective view illustrating a camera module according to one embodiment. FIG. 24 is an exploded perspective view illustrating the camera module according to one embodiment. FIG. 25 is a view of the camera module shown in FIG. 24 when observed from a different direction. The camera module according to the embodiment may include a lens holder 1000, a first lens unit 2000, a second lens unit 3000, and a printed circuit board 4000.

The lens holder 1000 may have therein a hollow region 1100, in which the first lens unit 2000 may be accommodated. The hollow region 1100 may be formed so as to penetrate the lens holder 1000 in the optical-axis direction so that light that has passed through the second lens unit 3000 is incident on the first lens unit 2000.

The lens holder 1000 may be coupled to a housing (not illustrated). The coupling of the lens holder 1000 and the housing may be realized by, for example, a fastening member (not illustrated). To this end, as illustrated in FIGS. 24 and 25, the lens holder 1000 may be provided in each of the corners thereof with a penetrating portion 1500, through which the fastening member is inserted.

However, this is merely illustrative. In another embodiment, the lens holder 1000 and the housing may be coupled to each other in an adhesion, shape-fitting or interference-fitting manner without using a fastening member.

The first lens unit 2000 may be accommodated in the hollow region 1100 formed in the lens holder 1000 and may include at least one lens. In the case in which the first lens unit 2000 includes a plurality of lenses, the lenses may be arranged in a line in the optical-axis direction to form an optical system.

In general, in the case in which the first lens unit 2000 is coupled to the lens holder 1000, the first lens unit 2000 is embodied as a lens barrel including at least one lens, and the lens barrel is coupled to the lens holder 1000 in a thread-engagement or adhesion manner.

In order to cause the lens barrel to be coupled to the lens holder 1000 in a thread-engagement manner, threads are formed in the inner circumferential surface of the hollow region 1100 formed in the lens holder 1000, and threads, which mesh with the threads formed in the hollow region 1100, are formed in the outer circumferential surface of the lens barrel.

In order to cause the lens barrel and the lens holder 1000 to be coupled to each other in an adhesion manner, an adhesive is provided between the inner circumferential surface of the hollow region 1100 in the lens holder 1000 and the outer circumferential surface of the lens barrel.

However, the configuration in which a lens barrel is provided so as to be coupled to the lens holder 1000 has the following problems.

In the case in which the lens barrel is coupled to the lens holder 1000 in an adhesion or thread-engagement manner, there may be a large difference between the design position of the lens barrel and the actual position thereof in the camera module.

This difference may occur, for example, when the angle at which the lens barrel is tilted with respect to the optical-axis direction exceeds a design range. When the lens barrel is excessively tilted, it becomes impossible or very difficult to set the focal length between the lens barrel and the image sensor 7000.

Further, in the case in which the lens barrel is coupled to the lens holder 1000 in an adhesion manner, a process of applying an adhesive to a region between the inner circumferential surface of the hollow region 1100 in the lens holder 1000 and the outer circumferential surface of the lens barrel is added, and thus the camera module assembly process becomes complicated and time-consuming.

Still further, in the case in which lenses are installed in the lens barrel, a separate sealing member needs to be provided in the lens barrel in order to prevent moisture or other foreign substances from being introduced into the lens barrel including lenses installed therein, and thus the structure of the lens barrel becomes complicated.

Therefore, in order to solve the above problems, in the embodiment, the lenses of the first lens unit 2000 are directly installed in the hollow region 1100 formed in the lens holder 1000 without using a lens barrel. The configuration in which the first lens unit 2000 is installed to the lens holder 1000 will be described below in detail with reference to FIG. 26.

The second lens unit 3000 may be coupled to the lens holder 1000 so as to close the hollow region 1100, and may be arranged so as to be aligned with the first lens unit 2000 in the optical-axis direction. The second lens unit 3000 may include at least one lens and may be coupled to the lens holder 1000 so as to be exposed to the forward region of the camera module.

The second lens unit 3000 may serve to protect the first lens unit 2000 disposed in the hollow region 1100 by closing the hollow region 1100 and to widen the view angle of the camera module according to the embodiment.

The second lens unit 3000 may be coupled to the lens holder 1000 in a thread-engagement or adhesion manner. The coupling structure of the second lens unit 3000 and the lens holder 1000 will be described below in detail with reference to FIG. 26.

The printed circuit board 4000 may be disposed under the lens holder 1000 so as to face the first lens unit 2000 and the second lens unit 3000 in the optical-axis direction. An image sensor 7000 may be installed on the printed circuit board 4000. A detailed explanation of the printed circuit board 4000 and the image sensor 7000 will be made below with reference to FIG. 27.

Figure 26:
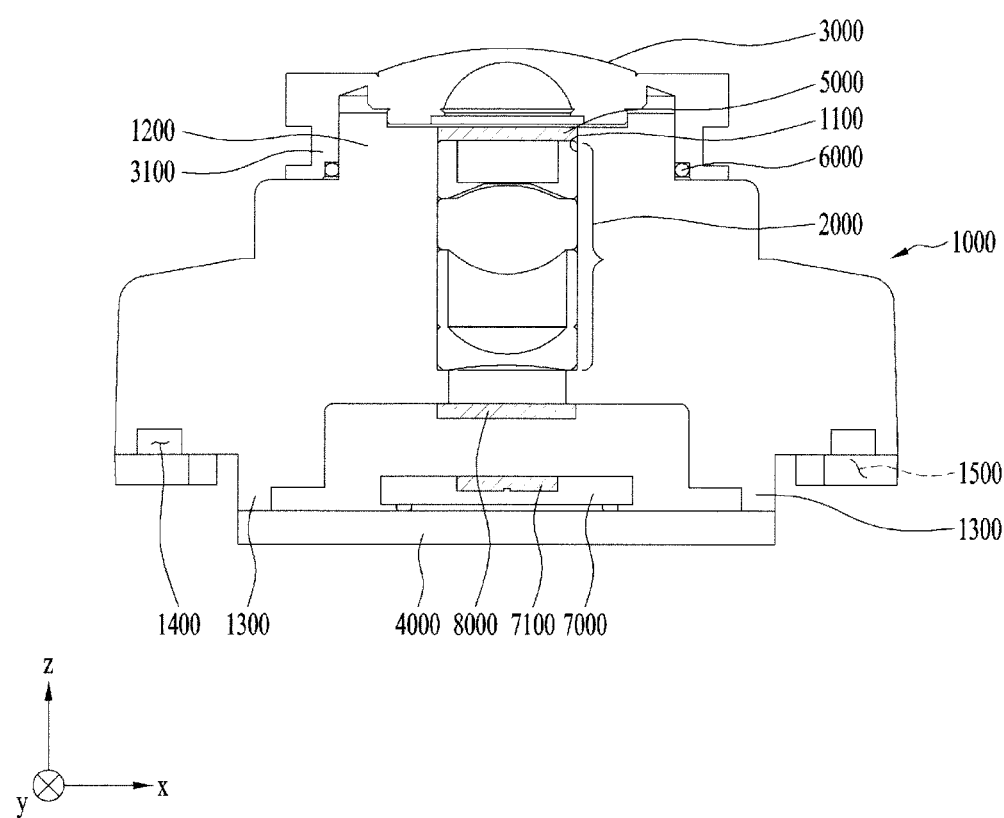
FIG. 26 is a cross-sectional view illustrating a camera module including a filter according to one embodiment.

FIG. 26 is a cross-sectional view illustrating a camera module including a filter 8000 according to one embodiment. As illustrated in FIG. 26, the second lens unit 3000 may be coupled to the lens holder 1000 so as to be located at the front side of the camera module.

In order to enable coupling of the second lens unit 3000 and the lens holder 1000, a first coupling portion 1200 and a second coupling portion 3100 may be provided. The first coupling portion 1200 may be formed so as to surround the hollow region 1100 at the upper side of the lens holder 1000.

The first coupling portion 1200 may have a structure in which the lens constituting the second lens unit 3000 is seated therein. In order to allow the lens constituting the second lens unit 3000 to be seated in the first coupling portion 1200, the first coupling portion 1200 may have a shape corresponding to the shape of the lens to be seated therein.

For example, in one embodiment, the first coupling portion 1200 may have an avoidance structure or a protruding structure so as to correspond to a protruding structure or an avoidance structure of the lens to be seated therein.

The second coupling portion 3100 may be coupled to the second lens unit 3000. The second coupling portion 3100 may be formed so as to surround the first coupling portion 1200 and may be coupled to the first coupling portion 1200.

Thus, the second lens unit 3000 may be coupled to the lens holder 1000 through the coupling of the second coupling portion 3100 to the first coupling portion 1200.

In one embodiment, the first coupling portion 1200 and the second coupling portion 3100 may be coupled to each other in an adhesion manner. For example, an adhesive may be applied to at least one of the outer circumferential surface of the first coupling portion 1200 and the inner circumferential surface of the second coupling portion 3100, whereby the first coupling portion 1200 and the second coupling portion 3100 may be coupled and fixed to each other by the adhesive.

Of course, referring to FIG. 26, the first coupling portion 1200 and the second coupling portion 3100 may be more securely coupled to each other by applying an adhesive to at least one of the bottom surface of the first coupling portion 1200 and the surface of the second coupling portion 3100 that corresponds to the bottom surface of the first coupling portion 1200.

In another embodiment, the first coupling portion 1200 and the second coupling portion 3100 may be coupled to each other in a thread-engagement manner. For example, threads may be formed in the outer circumferential surface of the first coupling portion 1200, and threads, which mesh with the threads of the first coupling portion, may be formed in the inner circumferential surface of the second coupling portion 3100. As a result, the first coupling portion 1200 and the second coupling portion 3100 may be coupled to each other in a thread-engagement manner.

Meanwhile, in the case in which the first coupling portion 1200 and the second coupling portion 3100 are coupled to each other in an adhesion manner, an adhesive may seal a region between the first coupling portion 1200 and the second coupling portion 3100, thereby preventing foreign substances from being introduced from the outside into the hollow region 1100.

However, in the case in which the first coupling portion 1200 and the second coupling portion 3100 are coupled to each other in a thread-engagement manner, a sealing member 6000 may be provided between the lens holder 1000 and the second coupling portion 3100 in order to seal a region between the first coupling portion 1200 and the second coupling portion 3100.

The sealing member 6000 may be disposed between the first coupling portion 1200 and the second coupling portion 3100. For example, as illustrated in FIG. 26, a space may be formed between the first coupling portion 1200 and the second coupling portion 3100 so as to surround the first coupling portion 1200, and the sealing member 6000 may be installed in this space.

The surrounding space may be formed in the lens holder 1000 and/or the second coupling portion 3100. In the case in which the lens holder 1000 and the second coupling portion 3100 are coupled to each other without the sealing member 6000, the surrounding space may be formed so as to provide an avoidance structure such as an empty space, a hole or the like.

The sealing member 6000 may be embodied as, for example, an O-ring. Accordingly, the sealing member 6000 may effectively prevent external foreign substances from being introduced into the hollow region 1100.

In the embodiment illustrated in FIG. 26, a plurality of lenses may be arranged in a line in the optical-axis direction in the hollow region 1100 formed in the lens holder 1000. That is, the first lens unit 2000 may include a plurality of lenses aligned in the optical-axis direction.

At this time, as described above, a plurality of lenses may not be installed in a separate lens barrel, but may be directly installed in the hollow region 1100.

Referring to FIG. 26, based on the drawing, a plurality of lenses constituting the first lens unit 2000 may be sequentially installed from the upper side to the lower side in the hollow region 1100 formed in the lens holder 1000.

The bottom surface of the lens located at the lowermost side may be prevented from moving downwards by a stepped surface formed at the lower portion of the hollow region 1100. A stepped portion, at which the stepped surface is formed, may serve as a stopper.

In another embodiment, the top surface of the lens located at the uppermost side may be prevented from moving upwards by a stepped surface formed at the upper portion of the hollow region 1100. A stepped portion at which the stepped surface is formed may serve as a stopper.

After the lenses constituting the first lens unit 2000 are sequentially installed in the optical-axis direction in the hollow region 1100, the second lens unit 3000 may be coupled to the lens holder 1000, whereby the installation of the lenses of the first lens unit 2000 in the hollow region 1100 in the lens holder 1000 may be completed.

At this time, a spacer 5000 may be disposed between the first lens unit 2000 and the second lens unit 3000. The spacer 5000 may serve to maintain the lenses of the first lens unit 2000 to be securely installed in the hollow region 1100 without being shaken in the optical-axis direction.

That is, when the second lens unit 3000 is coupled to the lens holder 1000, the second lens unit 3000 may press the spacer 5000 in the optical-axis direction, and accordingly, the spacer 5000 may press the first lens unit 2000 in the optical-axis direction. With this configuration, the lenses of the first lens unit may be prevented from being shaken in the optical-axis direction in the hollow region 1100.

Meanwhile, the lenses of the first lens unit 2000 need to be installed so as not to be shaken in a direction perpendicular to the optical-axis direction, i.e. in the x-y plane. This may be realized by, for example, appropriately adjusting the diameters of the lenses of the first lens unit 2000 and the diameter of the hollow region 1100 so that the lenses of the first lens unit 2000 are tightly fitted into the hollow region 1100.

In the embodiment configured as described above, since the lenses are directly installed in the lens holder 1000 without using a separate lens barrel, it is possible to prevent the occurrence of a large difference between the design position of the lens barrel and the actual position thereof in the camera module, compared to the configuration using a lens barrel.

In addition, since the tilting angle of the first lens unit 2000 does not exceed a design range, the alignment of the focal length between the first lens unit 2000 and the image sensor 7000 becomes easy and simple.

In the embodiment, an adhesive application process may be omitted by installing the first lens unit 2000 in the lens holder 1000 without using an adhesion method, and thus the camera module assembly process may be performed rapidly and simply.

In addition, because a lens barrel is not used, it is not necessary to use a separate sealing member included in a lens barrel.

The camera module according to the embodiment may further include a filter 8000. The filter 8000, as illustrated in FIG. 26, may be disposed between the first lens unit 2000 and the image sensor 7000, and may face the first lens unit 2000 and the image sensor 7000 in the optical-axis direction.

The filter 8000 may serve to prevent light within a specific frequency band, among light passing through the first lens unit 2000 and traveling to the image sensor 7000, from being incident on the image sensor 7000. Here, the filter 8000 may be, for example, an infrared (IR) cut-off filter or an IR pass filter.

The filter 8000 may be formed in a circular or polygonal shape when viewed in the optical-axis direction. Although the filter 8000 is illustrated in FIG. 26 as being disposed in a space formed in the lower end of the slot, this is merely illustrative.

In another embodiment, the filter 8000 may be disposed in the hollow region 1100. For example, referring to FIG. 26, the filter 8000 may be disposed in a space formed in the stepped portion of the hollow region 1100.

In a further embodiment, referring to FIG. 26, the filter 8000 may be disposed in a space formed between the lower end of the hollow region 1100 and the top surface of the image sensor 7000 so as to be spaced apart from the lower end of the hollow region 1100.

Meanwhile, as illustrated in FIG. 26, the printed circuit board 4000 may be coupled to the lower portion of the lens holder 1000 by an adhesive. To this end, the lens holder 1000 may include a third coupling portion 1300.

Referring to FIG. 25, the third coupling portion 1300 may protrude from the bottom surface of the lens holder 1000 and may be formed in a closed curve shape when viewed from below. Alternatively, the third coupling portion 1300 may be formed in a discontinuous shape such that at least one portion thereof is cut, rather than being formed in a closed curve shape.

The printed circuit board 4000 may be coupled to the third coupling portion 1300. Here, the printed circuit board 4000 may be coupled to the third coupling portion 1300 in an adhesion manner.

The coupling between the printed circuit board 4000 and the third coupling portion 1300 in an adhesion manner may be performed through an active alignment process. In order to facilitate the active alignment process, an adhesive may be embodied as an adhesive made from a thermosetting and UV-curing material.

In the embodiment, the active alignment process is a process of adjusting the focal length between the first lens unit 2000 and the image sensor 7000, which face each other, by moving the printed circuit board 4000 in the optical-axis direction or a process of adjusting the focal length between the first lens unit 2000 and the image sensor 7000 by tilting, i.e. rotating, the printed circuit board 4000 in the x-y plane, which is perpendicular to the optical-axis direction.

In order to realize the active alignment process, it may be desirable for the adhesive to be provisionally cured during the active alignment process and to be permanently cured after the active alignment process is completed.

Therefore, for example, a hybrid adhesive, which reacts both to ultraviolet light and to heat and is cured, may be used as the adhesive for coupling the printed circuit board 4000 and the third coupling portion 1300 to each other.

During the active alignment process, in the state in which the focal length between the first lens unit 2000 and the image sensor 7000 is adjusted, the adhesive may be provisionally cured by radiating ultraviolet light to the printed circuit board 4000 and/or the third coupling portion 1300.

After the active alignment process is completed, the adhesive may be permanently cured by heating the same. For example, the adhesive may be heated in an oven or the like.

According to the embodiment, since the lens holder 1000 and the printed circuit board 4000 of the camera module are coupled to each other through the active alignment process, the focal point of the first lens unit 2000, which is coupled to the lens holder 1000, may be located at an optimum position in the image sensor 7000, which is installed on the printed circuit board 4000, and consequently, the quality of the image captured by the camera module may be improved.

Figure 30:
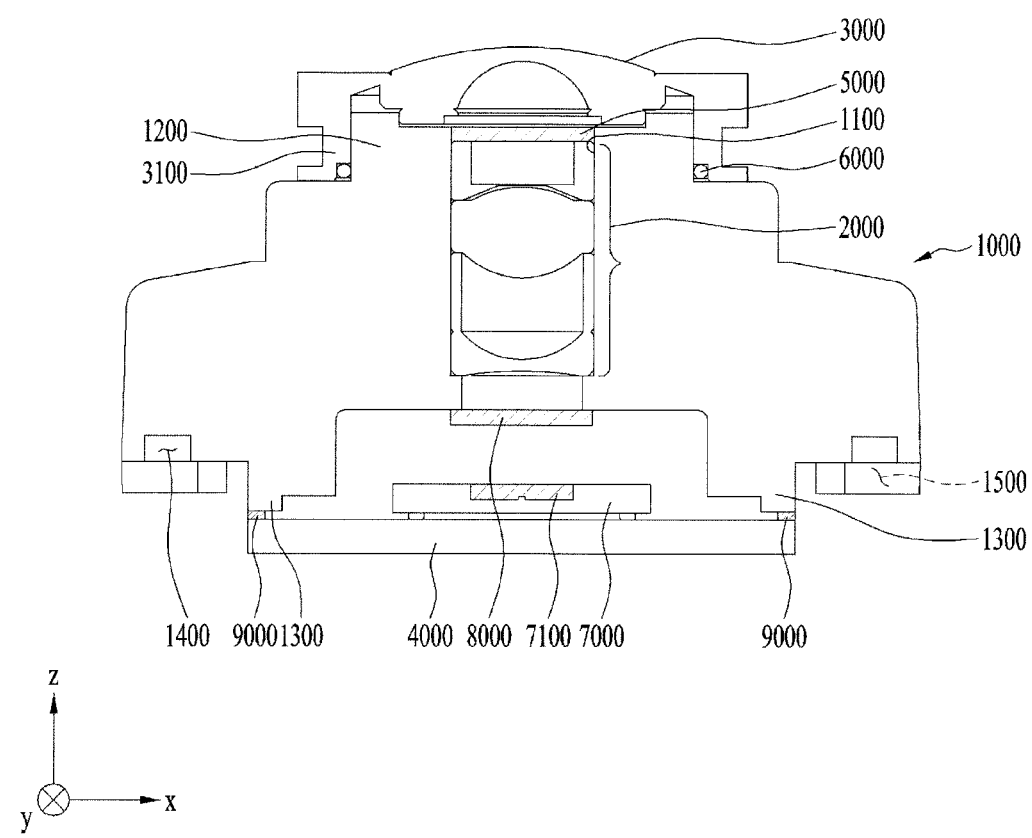
FIG. 30 is a cross-sectional view of the configuration shown in FIG. 26, to which an adhesion unit is added. Although illustration of the adhesion unit is omitted from FIG. 26 for clarity, the adhesion unit may also be provided in the camera module according to the embodiment shown in FIG. 26.

In one embodiment illustrated in FIG. 30, the above-described adhesive may be embodied as an adhesion unit 9000. The adhesion unit 9000 will be described below in detail with reference to FIG. 30.

Figure 27:
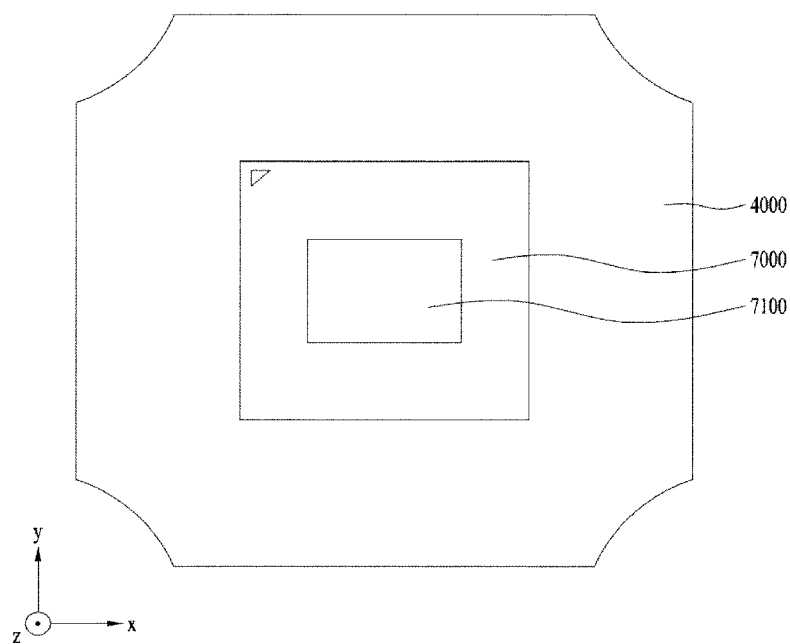
FIG. 27 is a front view illustrating a printed circuit board according to one embodiment, on which an image sensor is installed.

FIG. 27 is a front view illustrating a printed circuit board 4000 according to one embodiment, on which the image sensor 7000 is installed. Referring back to FIG. 26, the printed circuit board 4000 may be disposed so as to be aligned with the first lens unit 2000 in the optical-axis direction.

The printed circuit board 4000 may be disposed so as to face the first lens unit 2000, with the filter 8000 interposed therebetween. The image sensor 7000 may be installed on the surface of the printed circuit board 4000 that faces the first lens unit 2000. An electromagnetic circuit including various circuit elements may be formed on the surface of the printed circuit board 4000 that faces the first lens unit 2000.

The image sensor 700, which is installed on the printed circuit board 4000, may be disposed so as to face the first lens unit 2000 and the second lens unit 3000 in the optical-axis direction. In addition, the image sensor 7000 may include a sensing unit 7100 disposed so as to face the first lens unit 2000.

Light incident through the first lens unit 2000 and the second lens unit 3000 may be sensed by the sensing unit 7100 provided in the image sensor 7000. The printed circuit board 4000 may convert an image sensed from the light incident on the sensing unit 7100 into an electric signal and may transmit the electric signal to an external image storage device or an external image reproduction device.

Figure 28:
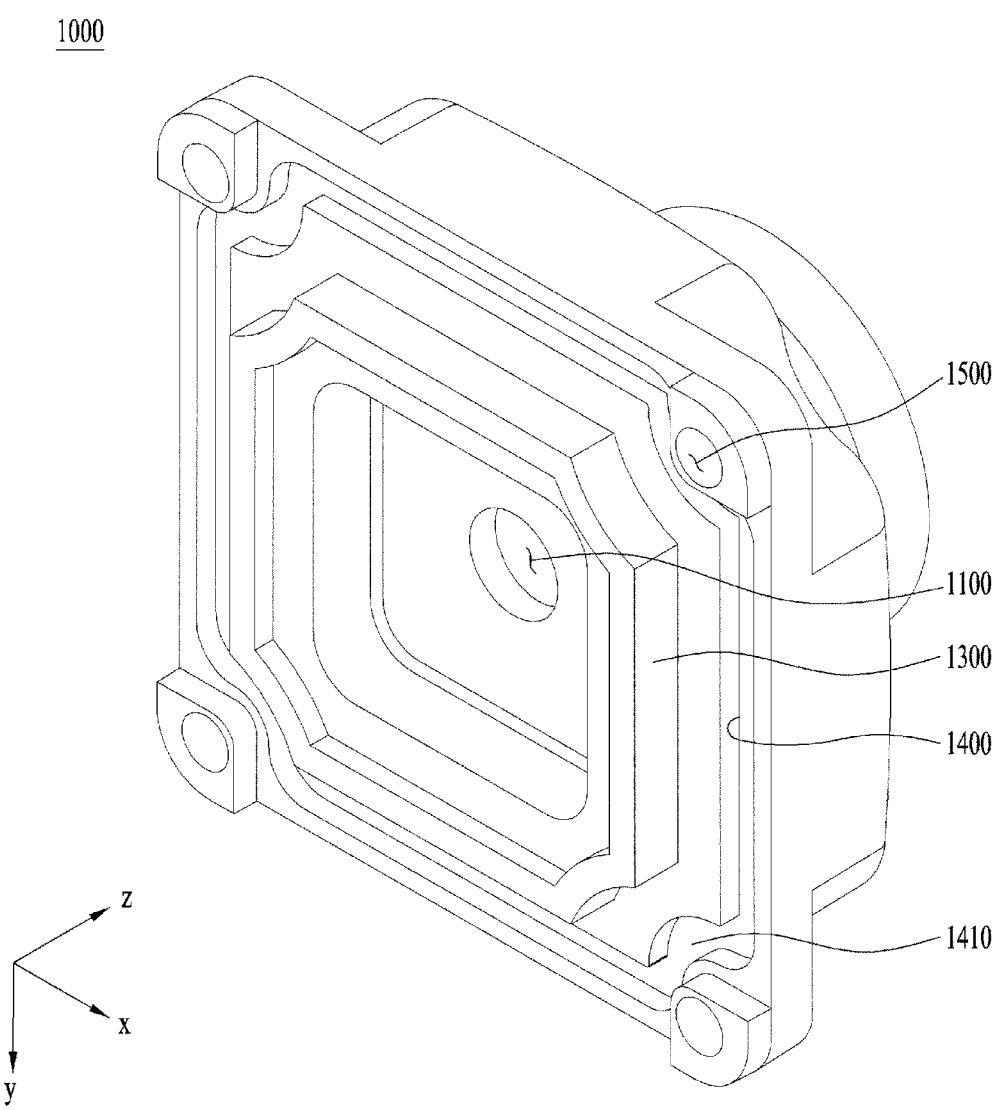
FIG. 28 is a rear perspective view illustrating a lens holder according to one embodiment.
Figure 29:
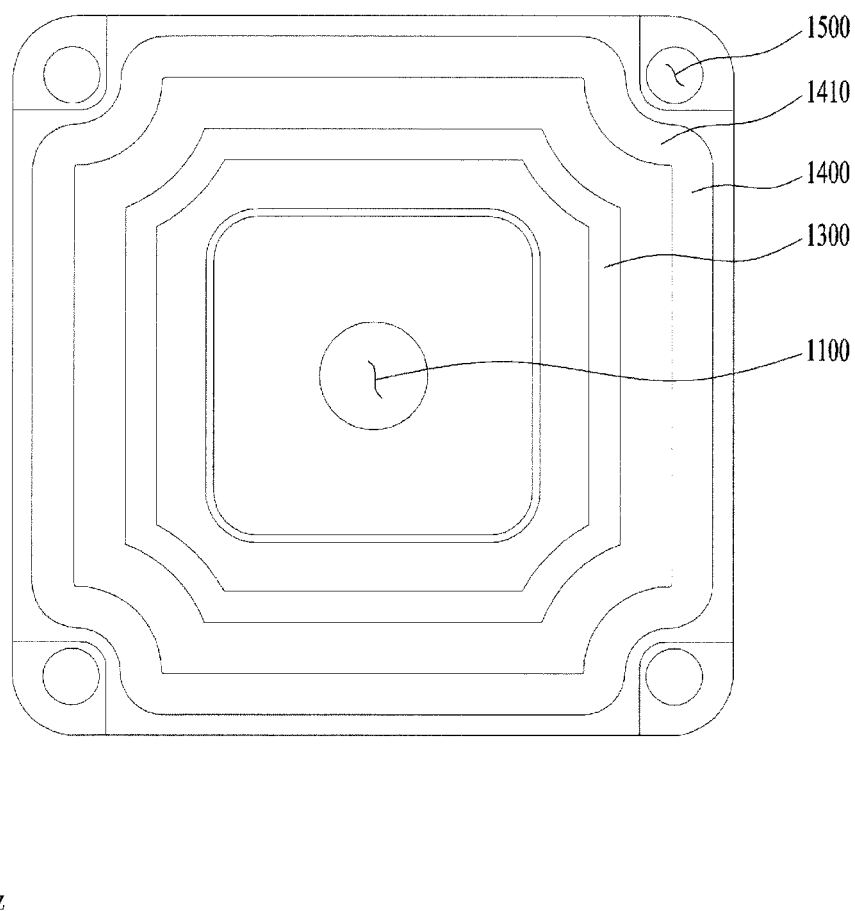
FIG. 29 is a rear view of FIG. 28.

FIG. 28 is a perspective view illustrating a lens holder 1000 according to one embodiment. FIG. 29 is a rear view of FIG. 28. As illustrated in FIGS. 28 and 29, the lens holder 1000 may have an installation recess 1400 formed in the rear surface of the lens holder 1000, i.e. the bottom surface thereof.

As described above, the lens holder 1000 may be coupled to a housing (not illustrated). A gap may be formed between the lens holder 1000 and the housing, and foreign substances may be introduced into the camera module through the gap.

Therefore, a gasket (not illustrate) may be provided at the coupling region between the lens holder 1000 and the housing in order to seal the foreign-substance-passing gap. As illustrated in FIGS. 28 and 29, the installation recess 1400 may be formed for installation of the gasket.

The installation recess 1400 may be concavely formed in the bottom surface of the lens holder 1000 in a closed curve shape so as to surround the printed circuit board 4000. The gasket may be installed in the installation recess 1400.

The installation recess 1400 may be provided with an avoidance portion 1410. Since the lens holder 1000 is provided with the penetrating portion 1500, the installation recess 1400 needs to have a structure capable of avoiding interference with the penetrating portion 1500. Therefore, the installation recess 1400 may be provided with the avoidance portion 1410 at a position corresponding to the position of the penetrating portion 1500.

That is, referring to FIG. 29, based on the drawing, the installation recess 1400 may be formed at a position further inward than the penetrating portion 1500 and may be provided with the avoidance portion 1410 at a position corresponding to the position of the penetrating portion 1500, i.e. at each of the corners thereof.

Meanwhile, referring back to FIG. 27, since the avoidance portion 1410 is formed at the installation recess 1400, the printed circuit board 4000 may have an avoidance structure formed at a position corresponding to the position of the avoidance portion 1410 of the installation recess 1400.

FIG. 30 is a cross-sectional view of the configuration shown in FIG. 26, to which an adhesion unit 9000 is added. Although illustration of the adhesion unit 9000 is omitted from FIG. 26 for clarity, the adhesion unit 9000 may also be provided in the camera module according to the embodiment shown in FIG. 26.

The camera module according to the embodiment may include the adhesion unit 9000. The adhesion unit 9000, as illustrated in FIG. 30, may be disposed between the bottom surface of the lens holder 1000 and the top surface of the printed circuit board 4000 in order to couple the bottom surface of the lens holder 1000 and the top surface of the printed circuit board 4000 to each other. That is, the adhesion unit 9000 may serve to couple the lens holder 1000 and the printed circuit board 4000 to each other.

Here, one side surface of the adhesion unit 9000 may be exposed from an internal space formed by the coupling of the printed circuit board 4000 and the lens holder 1000.

The adhesion unit 9000 may be formed by applying an adhesive to the top surface of the printed circuit board 4000 or the bottom surface of the lens holder 1000, i.e. the bottom surface of the third coupling portion 1300. Meanwhile, as described above, the active alignment process may be performed using, as the adhesive, for example, a hybrid adhesive, which reacts both to ultraviolet light and to heat and is cured.

Figure 31:
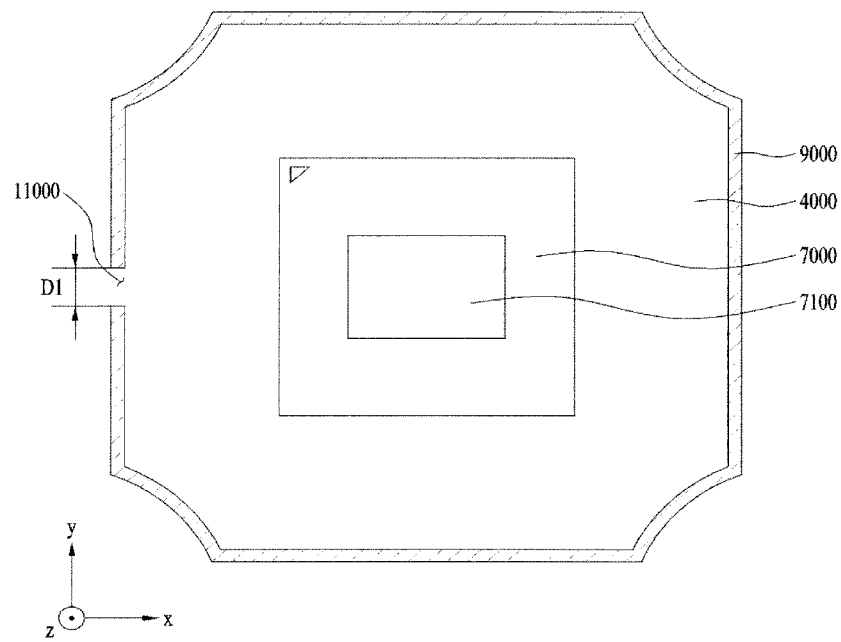
FIG. 31 is a view showing an opening according to one embodiment.

In FIG. 31 and drawings given below, the adhesion unit 9000 is illustrated as being formed by applying an adhesive to the printed circuit board 4000. Of course, however, the adhesion unit 9000 may be formed by applying an adhesive to the bottom surface of the third coupling portion.

Figure 32:
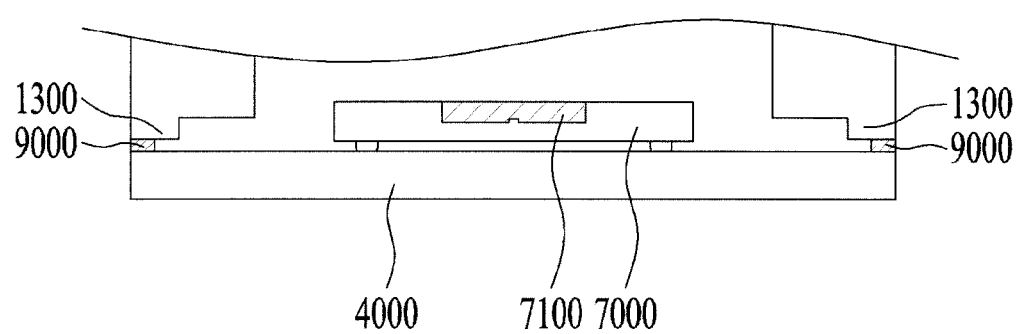
FIG. 32 is a view showing the shape of the side surface of FIG. 26.

FIG. 31 is a view showing an opening according to one embodiment. FIG. 32 is a view showing the shape of the side surface of FIG. 26.

The adhesion unit 9000, referring to FIG. 31, may be disposed in a closed curve shape along the edge of the bottom surface of the lens holder 1000 and the edge of the top surface of the printed circuit board 4000.

Referring to FIG. 31, the printed circuit board 4000 according to the embodiment may have an overall rectangular shape. The printed circuit board 4000 may have an indented avoidance structure at a position corresponding to the fastening position of a fastening member (not illustrated), i.e. at each of the corners thereof. Accordingly, the adhesion unit 9000 may also be formed in a rectangular shape having an indented avoidance structure formed at each of the corners thereof.

As illustrated in FIG. 31, the adhesion unit 9000 may include an opening. The opening may be formed in a portion of the adhesion unit 9000 and may serve to cause a portion of the internal space formed by the coupling of the printed circuit board 4000 and the lens holder 1000 to be open to the outside therethrough.

One embodiment of the opening, as illustrated in FIG. 31, may be embodied as a first through-hole 11000 formed in one side of the adhesion unit 9000.

Because the first through-hole 11000 is formed in the adhesion unit 9000, when the adhesion unit 9000 is heated to be cured, air, which occupies the internal space formed by the coupling of the printed circuit board 4000 and the lens holder 1000, may expand due to the heat, and a portion of the air that expands may move outside through the first through-hole 11000.

That is, since the internal space and the outside communicate with each other through the first through-hole 11000, when the air present in the internal space is heated, a portion of the air may move outside from the internal space.

With this configuration, even when the adhesion unit 9000 is heated, it is possible to prevent deformation of the printed circuit board 4000 or variation in the focal length of the camera module, which may be caused by expansion of the air present in the internal space.

The first through-hole 11000 may have a width D1 of, for example, 0.1 mm to 0.3 mm. However, the width may be increased or decreased in consideration of the overall size of the camera module and the arrangement of the parts.

Although the embodiment illustrated in FIG. 31 is configured such that one first through-hole 11000 is formed in the side of the adhesion unit 9000, the disclosure is not limited thereto. That is, the first through-hole 11000 may be formed in the indented avoidance structure of the adhesion unit 9000, or may be provided in a plural number, e.g. the number of first through-holes may be two or more.

The cross-section of the first through-hole 11000 may have a circular shape, an elliptical shape, a rectangular shape, a polygonal shape, etc.

Figure 33:
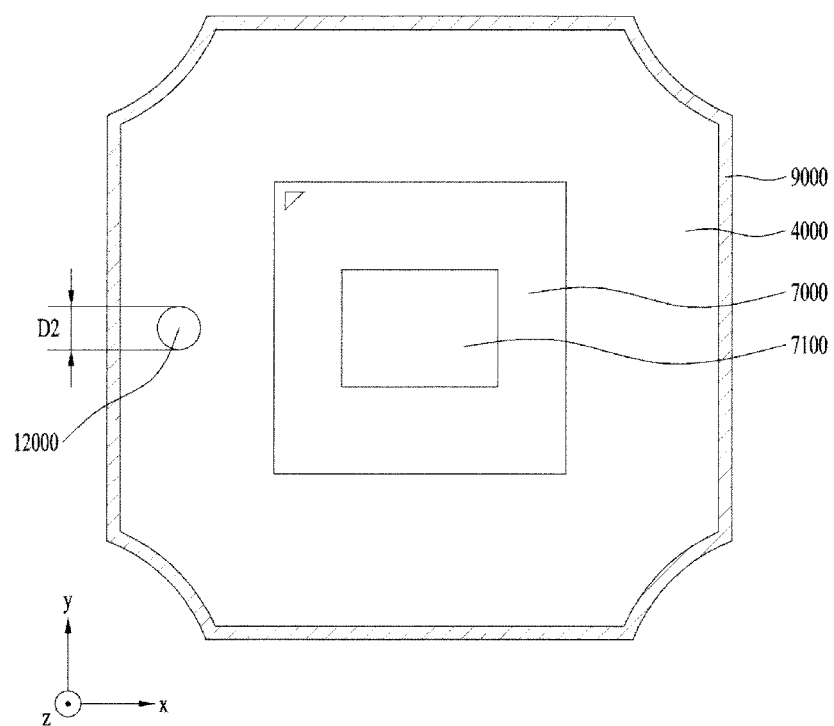
FIG. 33 is a view showing an opening according to another embodiment.

An opening as another embodiment of the first through-hole 11000 will be described below. As illustrated in FIG. 33, an opening according to another embodiment may be embodied as a second through-hole 12000, which is formed in the printed circuit board 4000 in the first direction, i.e. in the upward-and-downward direction. For example, the second through-hole 12000 may be formed in the printed circuit board 4000 in the shape of a via hole.

The second through-hole 12000 may be formed so as to penetrate the printed circuit board 4000. Thus, when the adhesion unit 9000 is heated to be cured, a portion of the air that occupies the internal space and expands due to heat may move outside through the second through-hole 12000.

That is, since the internal space and the outside communicate with each other through the second through-hole 12000, when the air present in the internal space is heated, a portion of the air may move outside from the internal space.

With this configuration, even when the adhesion unit 9000 is heated, it is possible to prevent deformation of the printed circuit board 4000 or variation in the focal length, which may be caused by expansion of the air present in the internal space.

The second through-hole 12000 may be formed at a position further inward than the curve formed by the adhesion unit 9000. That is, referring to FIG. 33, the second through-hole 12000 may be formed between the image sensor 7000 and the adhesion unit 9000. With this configuration, the second through-hole 12000 may cause the internal space and the outside to communicate with each other.

The second through-hole 12000 may have a width D2 of, for example, 0.1 mm to 0.3 mm, desirably about 0.2 mm. However, the width may be increased or decreased in consideration of the overall size of the camera module and the arrangement of the parts.

Although the embodiment illustrated in FIG. 33 is configured such that one second through-hole 12000 is formed near the side of the adhesion unit 9000, the disclosure is not limited thereto. That is, the second through-hole 12000 may be formed at an appropriate position between the image sensor 7000 and the adhesion unit 9000, or may be provided in a plural number, e.g. the number of second through-holes may be two or more.

Although the second through-hole 12000 is illustrated in FIG. 33 as having a circular-shaped cross-section, the disclosure is not limited thereto. The cross-section of the second through-hole 12000 may have an elliptical shape, a rectangular shape, a polygonal shape, etc.

Figure 34:
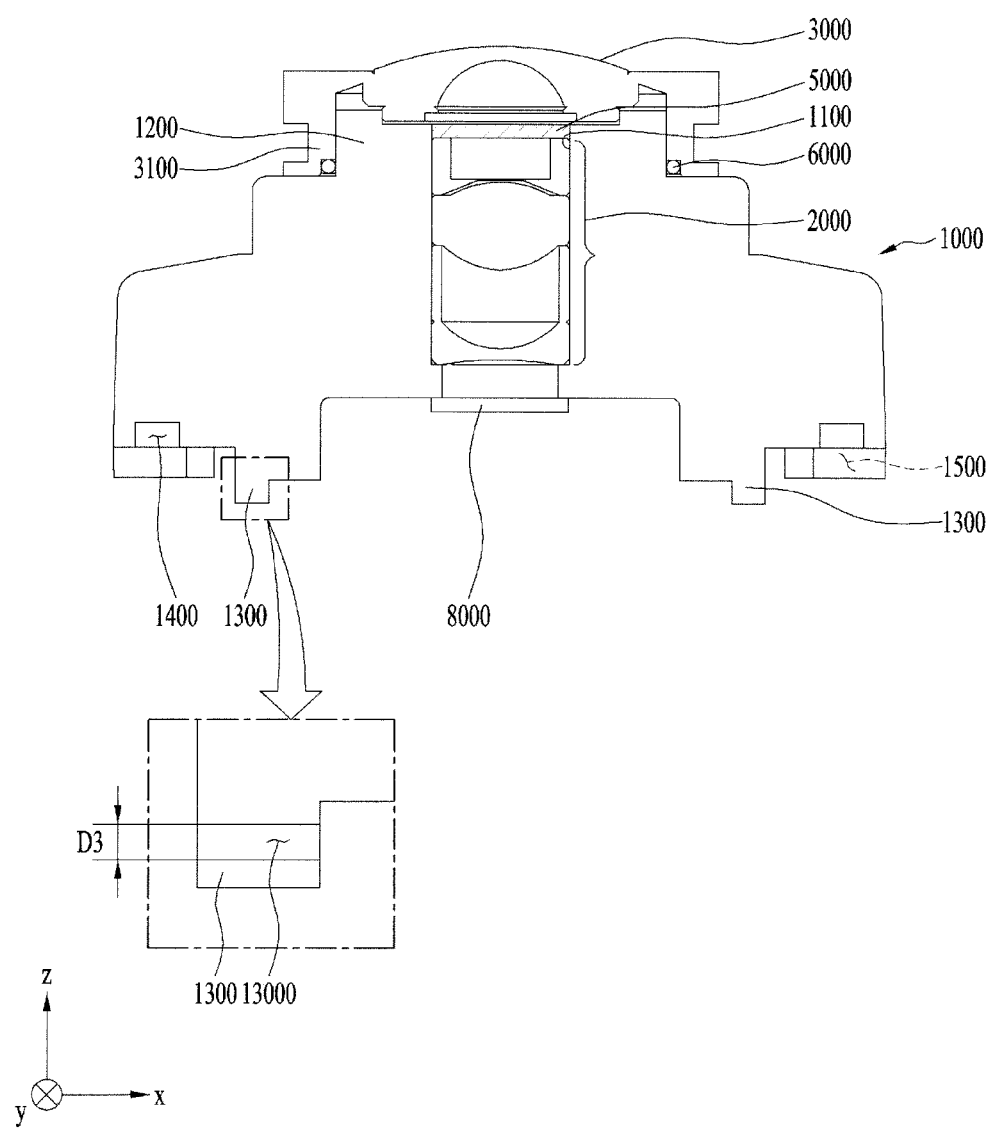
FIG. 34 is a view showing an opening according to a further embodiment.

An opening as a further embodiment of the second through-hole 12000 will be described below. As illustrated in FIG. 34, an opening according to a further embodiment may be embodied as a third through-hole 13000, which is formed in the lower portion of the lens holder 1000 so as to penetrate the lens holder 1000 in the lateral direction.

For example, as illustrated in FIG. 34, the third through-hole 13000 may be formed in the lower portion of the lens holder 1000, i.e. in the third coupling portion 1300 in the lateral direction of the lens holder 1000.

The third through-hole 13000 may be formed so as to penetrate the lens holder 1000 in the lateral direction. Thus, when the adhesion unit 9000 is heated to be cured, a portion of the air that occupies the internal space and expands due to heat may move outside through the third through-hole 13000.

That is, since the internal space and the outside communicate with each other through the third through-hole 13000, when the air present in the internal space is heated, a portion of the air may move outside from the internal space.

With this configuration, even when the adhesion unit 9000 is heated, it is possible to prevent deformation of the printed circuit board 4000 or variation in the focal length, which may be caused by expansion of the air present in the internal space.

The third through-hole 13000 may have a width D3 of, for example, 0.3 mm to 0.5 mm. However, the width may be increased or decreased in consideration of the overall size of the camera module and the arrangement of the parts.

Although the embodiment illustrated in FIG. 34 is configured such that one third through-hole 13000 is formed, the disclosure is not limited thereto. That is, the third through-hole 13000 may be provided in a plural number so as to penetrate the third coupling portion 1300 in the lateral direction. The number of third through-holes may be two or more.

The cross-section of the third through-hole 13000 may have a circular shape, an elliptical shape, a rectangular shape, a polygonal shape, etc.

In the case in which the opening is formed, external foreign substances may be introduced into the internal space through the opening and may be adsorbed to parts such as the image sensor 7000, leading to defective operation of the camera module.

Therefore, in order to prevent foreign substances from being introduced into the internal space through the opening, the opening may be blocked after the coupling of the lens holder 1000 and the printed circuit board 4000 is completed.

That is, because the opening plays its role only during the active alignment process, in which the holder 1000 and the printed circuit board 4000 are coupled to each other using the adhesion unit 9000, the opening becomes unnecessary after the adhesion unit 9000 is completely heated and cured.

Therefore, after the coupling of the lens holder 1000 and the printed circuit board 4000 is completed, the opening may be blocked in order to prevent external foreign substances from being introduced into the internal space through the opening.

The opening may be blocked using an adhesive. For example, a thermosetting adhesive, a UV-curing adhesive, the above-described hybrid adhesive, or the like may be used as the adhesive.

In the embodiment, when the air occupying the internal space expands while the adhesion unit 9000 is heated to be cured, a portion of the air moves outside from the internal space through the opening, thereby preventing the focal length of the camera module from exceeding a design range and preventing the adhesion unit 9000 or the printed circuit board 4000 from being damaged due to expansion of the air.

As a result, the camera module according to the embodiment is capable of preventing the focal length of the camera module from exceeding a design range and preventing the adhesion unit 9000 or the printed circuit board 4000 from being damaged, thereby preventing defective operation.

Although only a limited number of embodiments have been described above, various other embodiments are possible. The technical contents of the above-described embodiments may be combined into various forms as long as they are not incompatible with one another, and thus may be implemented in new embodiments.

INDUSTRIAL APPLICABILITY

In the embodiments, when air occupying a space formed by the front body and the board unit expands while the first adhesion unit is heated to be cured, a portion of the air moves outside through the through-hole, thereby preventing the focal length of the camera module from exceeding a design range and preventing the first adhesion unit or the board unit from being deformed or damaged due to expansion of the air. Thus, the embodiments have industrial applicability.

The invention claimed is:

1. A camera module comprising:
   a lens unit;
   a front body to which the lens unit is installed;
   a board unit spaced apart from the lens unit in a first direction;
   an image sensor disposed on the board unit, the image sensor facing the lens unit; and
   a first adhesion unit disposed between a first surface of the board unit and a second surface of the front body, the second surface of the front body facing the first surface of the board unit in the first direction,
   wherein the first adhesion unit comprises a plurality of segments spaced apart from each other and is configured to couple the first surface of the board unit and the second surface of the front body,
   wherein a through-hole is formed between two adjacent segments of the plurality of segments, and
   wherein a first portion of the first surface of the board unit corresponding to the through-hole in the first direction is spaced apart from the second surface of the front body.

2. The camera module according to claim 1, wherein the board unit comprises:
   a first board having the first surface on which the image sensor is installed, the first surface of the first board facing the lens unit;
   at least one second board spaced apart from the first board in the first direction; and
   a board-fixing member configured to couple the first board and the second board to each other.

3. The camera module according to claim 2, wherein the front body comprises a first protruding portion protruding toward the board unit and a first adhesion surface provided at a distal end of the first protruding portion,
   wherein the first board comprises a second adhesion surface provided at a position that faces the first adhesion surface and formed at the first surface thereof, and
   wherein the first adhesion unit is disposed between the first adhesion surface and the second adhesion surface.

4. The camera module according to claim 3, wherein the first adhesion surface of the first protruding portion has an uneven shape and the second adhesion surface of the first board has an uneven shape.

5. The camera module according to claim 3, wherein the first adhesion surface of the first protruding portion has an octagonal shape including long sides and short sides when viewed in the first direction.

6. The camera module according to claim 5, wherein the first adhesion unit has an octagonal shape corresponding to the shape of the first adhesion surface.

7. The camera module according to claim 6, wherein the through-hole is formed in the long sides of the first adhesion surface or the short sides of the first adhesion surface.

8. The camera module according to claim 3, wherein the first adhesion unit contacts the first adhesion surface and the second adhesion surface.

9. The camera module according to claim 2, wherein the board-fixing member comprises:
   a spacing portion disposed between the first board and the second board, and configured to space the first board and the second board apart from each other; and
   a first coupling portion coupled to a side surface of at least one second board.

10. The camera module according to claim 9, wherein a second coupling portion is provided at a side surface of the second board, and the second coupling portion has an uneven shape.

11. The camera module according to claim 10, wherein the first board has a slot coupled to the second coupling portion.

12. The camera module according to claim 1, comprising:
   a rear body coupled to the front body, the rear body accommodating the board unit and the image sensor therein,
   wherein the front body comprises a first protruding portion protruding toward the board unit and a first adhesion surface provided at a distal end of the first protruding portion, and
   wherein an oxide film is formed on the first adhesion surface by corrosion.

13. The camera module according to claim 1, wherein the first adhesion unit is made from a thermosetting and UV-curing material.

14. The camera module according to claim 1, wherein the first adhesion unit has an open curve shape.

15. The camera module according to claim 1, further comprising a second adhesion unit configured to fill the through-hole.

16. The camera module according to claim 1, wherein the through-hole is configured to cause an inside space formed by the front body and the board unit and an external space to communicate with each other.

17. The camera module according to claim 1, wherein the through-hole comprises a plurality of through-holes, and the plurality of through-holes are disposed at positions symmetrical to each other.

18. A camera module comprising:
   a front body comprising a first protruding portion and a first adhesion surface provided at a distal end of the first protruding portion, the first protruding portion being spaced inward from an outer perimeter of the front body;
   a lens unit disposed in the front body;
   a board unit comprising a second adhesion surface provided at a position that faces the first adhesion surface in a first direction;
   an image sensor disposed on the board unit, the image sensor facing the lens unit in the first direction; and
   a first adhesion unit disposed between the first adhesion surface and the second adhesion surface,
   wherein the first adhesion unit comprises a plurality of segments spaced apart from each other and is configured to couple the first adhesion surface and the second adhesion surface,
   wherein a through-hole is formed between two adjacent segments of the plurality of segments, and
   wherein a first portion of the second adhesion surface corresponding to the through-hole in the first direction is spaced apart from the first adhesion surface.

19. A camera module comprising:
   a front body comprising a first protruding portion and a first adhesion surface provided at a distal end of the first protruding portion, the first protruding portion being spaced inward from an outer perimeter of the front body;
   a lens unit disposed in the front body;
   a board unit comprising a first board, a second board spaced apart from the first board, and a board-fixing member configured to couple the first board and the second board to each other, wherein the first board comprises a second adhesion surface provided at a position that faces the first adhesion surface;
   an image sensor disposed on one surface of the first board facing the lens unit; and
   a first adhesion unit disposed between the first adhesion surface and the second adhesion surface and coupling the front body and the first board to each other,
   wherein the first adhesion unit comprises a plurality of segments spaced apart from each other and is configured to couple the first adhesion surface and the second adhesion surface,
   wherein a through-hole is formed between two adjacent segments of the plurality of segments, a first portion of the second adhesion surface corresponding to the through-hole in the first direction is spaced apart from the first adhesion surface, and
   wherein the board-fixing member is a ring shaped member, the ring shaped member including:
     a spacing portion disposed between the first board and the second board, and configured to space the first board and the second board apart from each other; and
     a coupling portion coupled to a side surface of the second board.

* * * * *